United States Patent [19]

Stemme et al.

[11] 4,340,288
[45] Jul. 20, 1982

[54] FILM CASSETTE AND METHOD OF MAKING THE SAME

[75] Inventors: Otto Stemme, Munich; Frank Staudacher, Haan; Peter Lermann, Naring; Justus Danhäuser, Leverkusen; Dieter Engelsmann, Unterhaching; Karl Wagner, Munich, all of Fed. Rep. of Germany

[73] Assignee: Agfa-Gevaert Aktiengesellschaft, Leverkusen, Fed. Rep. of Germany

[21] Appl. No.: 110,856

[22] Filed: Jan. 10, 1980

[30] Foreign Application Priority Data

Jan. 12, 1979 [DE] Fed. Rep. of Germany ....... 2901104
Mar. 7, 1979 [DE] Fed. Rep. of Germany ....... 2908814
Mar. 7, 1979 [DE] Fed. Rep. of Germany ....... 2908815
Mar. 7, 1979 [DE] Fed. Rep. of Germany ....... 2908816
May 25, 1979 [DE] Fed. Rep. of Germany ....... 2921348

[51] Int. Cl.³ .................... G03B 1/12; G03B 1/00; G03B 17/26
[52] U.S. Cl. .................... 354/171; 354/120; 354/213; 354/275
[58] Field of Search .............. 206/316, 455, 578, 601, 206/602, 604; 354/277, 288, 124, 203, 275, 276, 170–172, 212–214, 120

[56] References Cited

U.S. PATENT DOCUMENTS

| 461,308 | 10/1891 | Blair et al. ............... 354/275 X |
| 563,915 | 7/1896 | Eastman ................... 354/276 |
| 651,118 | 6/1900 | Fascal et al. ............. 354/214 |
| 728,718 | 5/1903 | Hutchings et al. ........ 354/277 |
| 2,002,035 | 5/1935 | Liebeskind ................ 206/455 |
| 2,544,844 | 3/1951 | Liber ....................... 206/316 |
| 2,894,141 | 7/1959 | Kollock ................... 354/277 |
| 3,685,414 | 8/1972 | Good ....................... 354/213 |
| 3,937,323 | 2/1976 | Sagi et al. ................ 206/601 |
| 4,053,910 | 10/1977 | Bodnar ..................... 354/120 |
| 4,093,069 | 6/1978 | Smolderen ................ 206/455 |
| 4,219,266 | 8/1980 | Carter ....................... 354/275 |

Primary Examiner—Donald A. Griffin
Attorney, Agent, or Firm—Michael J. Striker

[57] ABSTRACT

A novel film cartridge, camera for use with such cartridge and method of making such cartridge are disclosed. The cartridge is in form of a pocket of a material which is impermeable to light and which accommodates a multi-exposure film strip having a length at least equal to the length of the pocket. The pocket is provided with at least one opening extending transversely to its elongation and through which a leading end of the film strip extends to the exterior of the pocket so that it can be engaged by a film transporting mechanism of a camera suitable for accommodating such a pocket, which mechanism transports the film strip either in one continuous movement out of the pocket and into a storage space of the camera from where it is sequentially transported into the pocket in increments during which exposures are made, or else the film is sequentially transported out of the pocket and into the camera storage space with exposures being made during each transporting step and the exposed film is thereupon returned in a single movement into the pocket. However, the pocket may also have two parts one of which accommodates the non-exposed film strip which is then transported during exposures into the other part so that the film strip becomes completely located in the other part when it is fully exposed and a re-transportation into the first part of the pocket is not necessary. Cameras suitable for use with various embodiments of the novel cartridge are also disclosed, as well as methods of making the cartridge.

114 Claims, 37 Drawing Figures

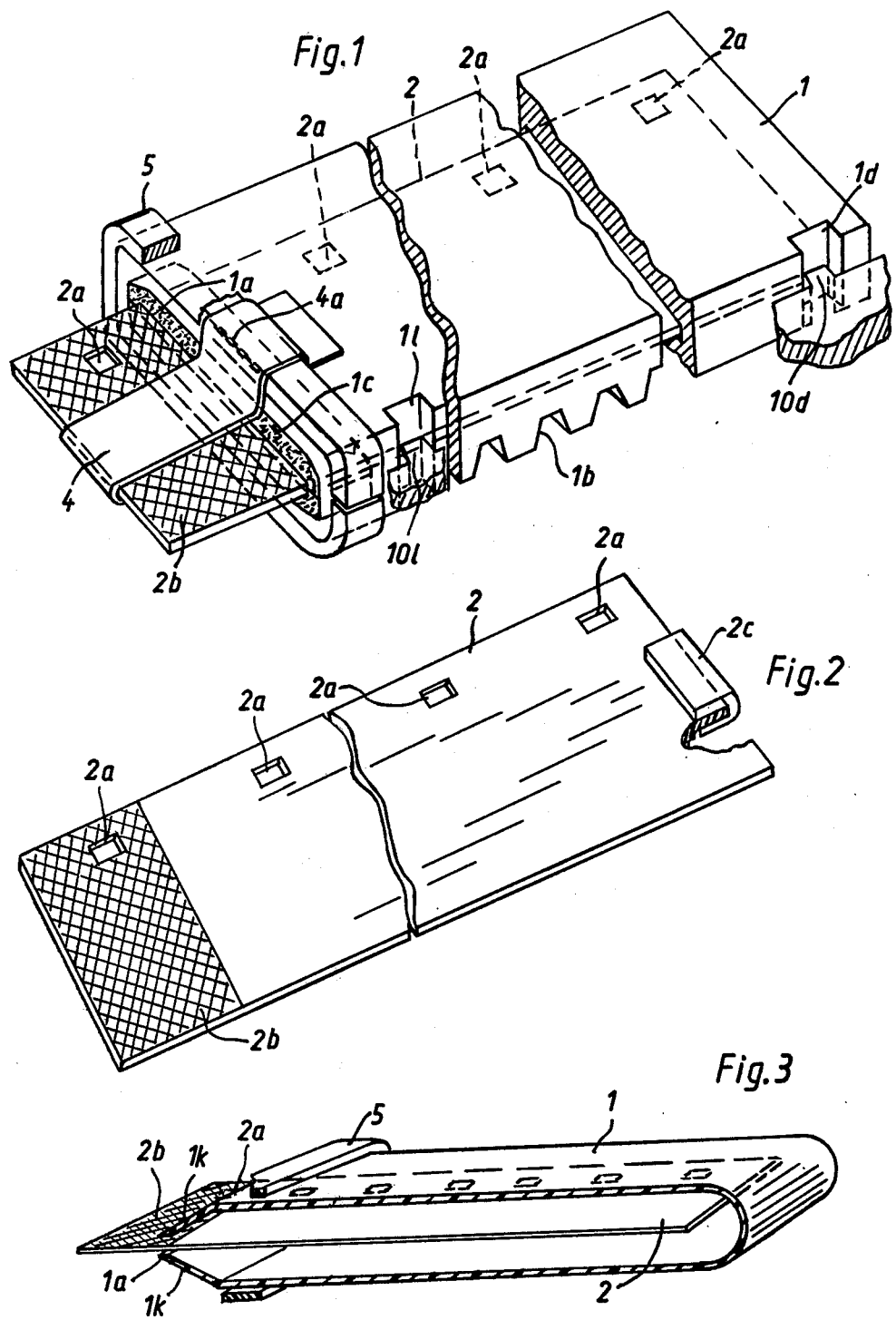

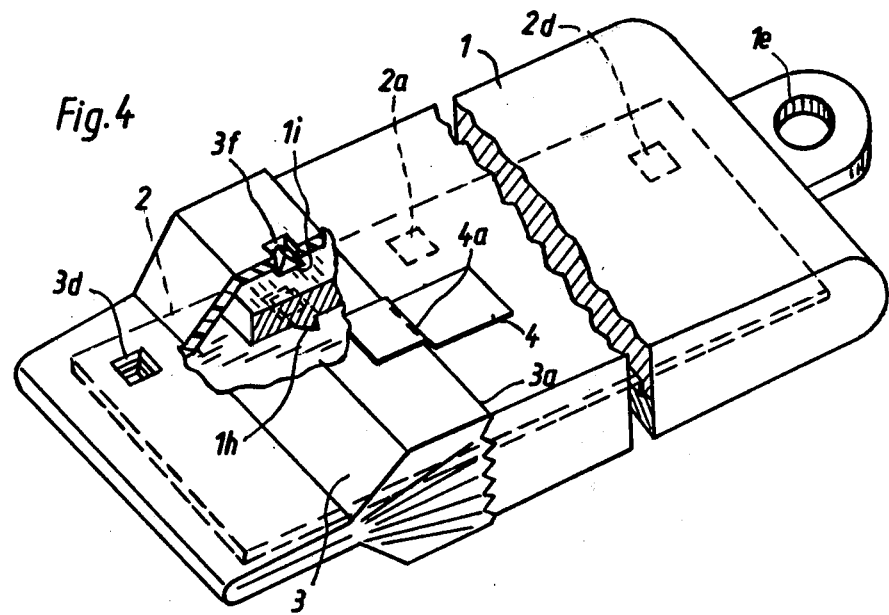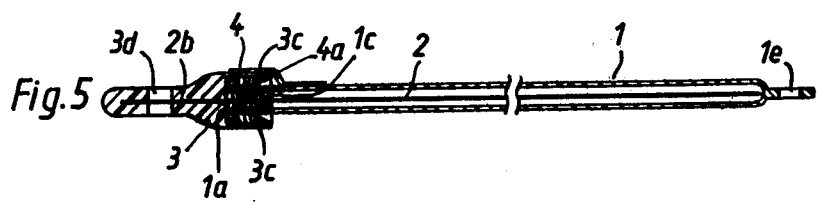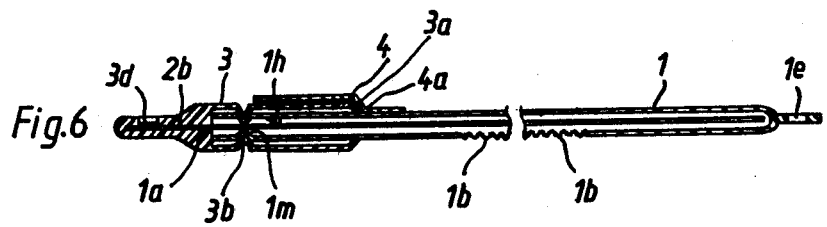

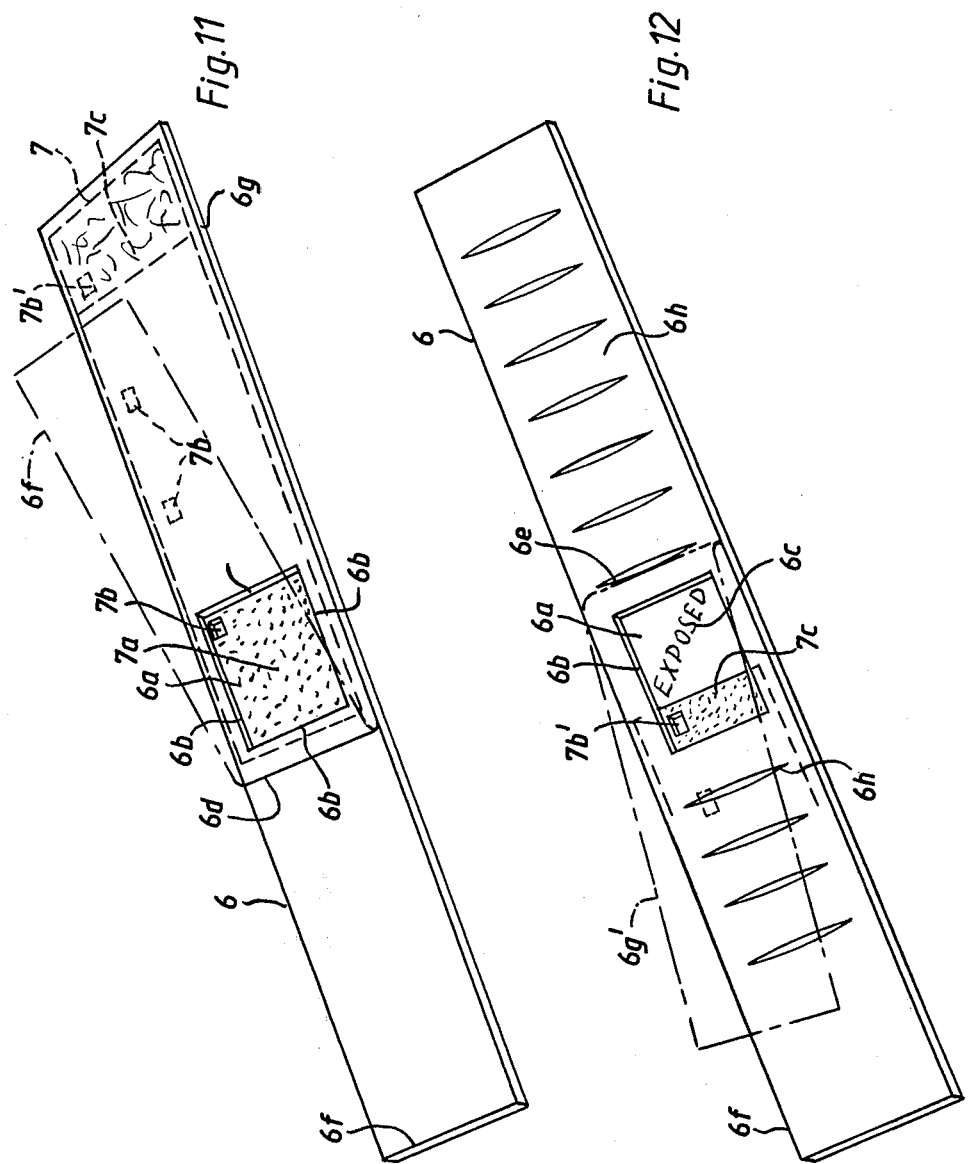

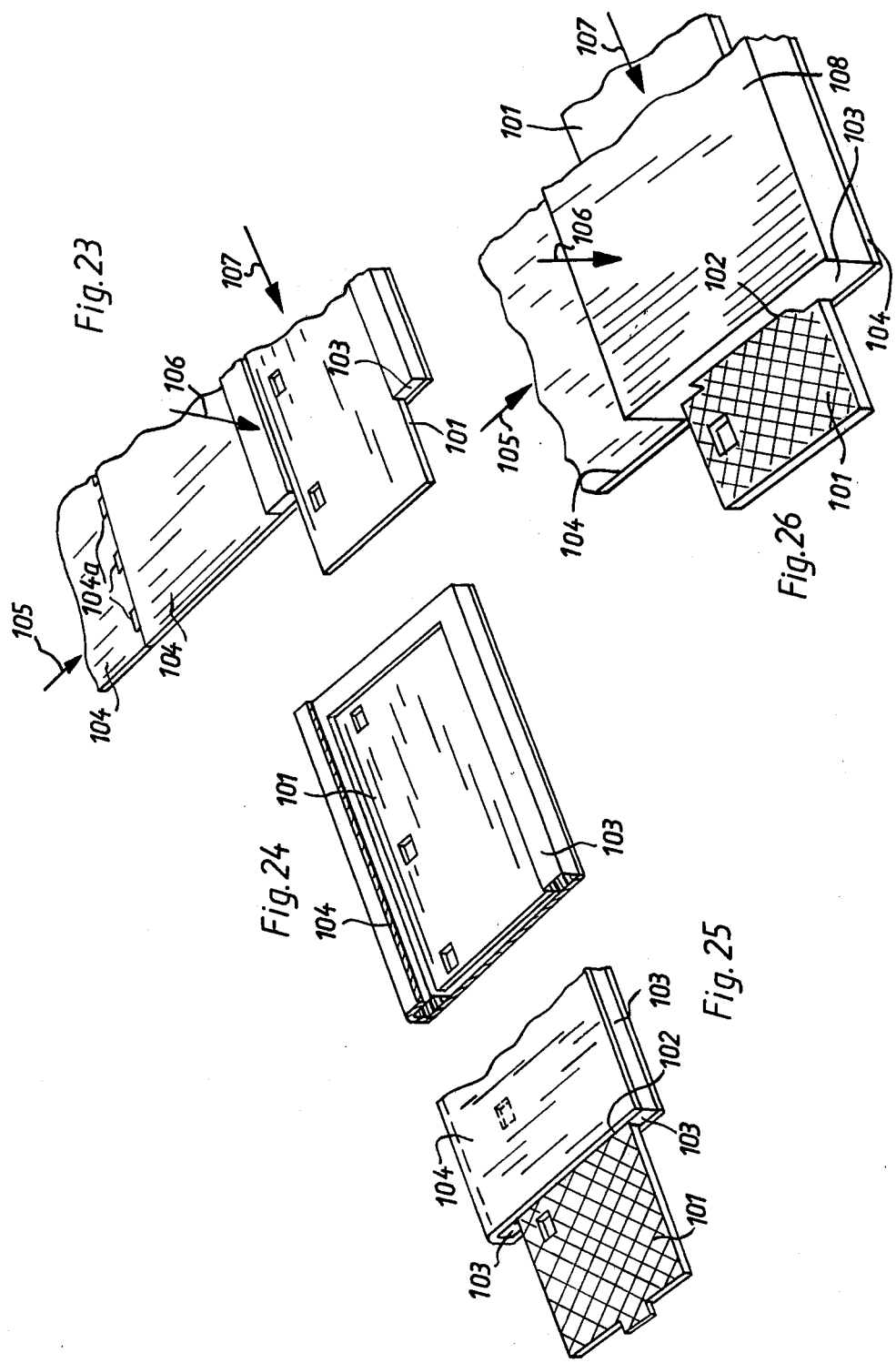

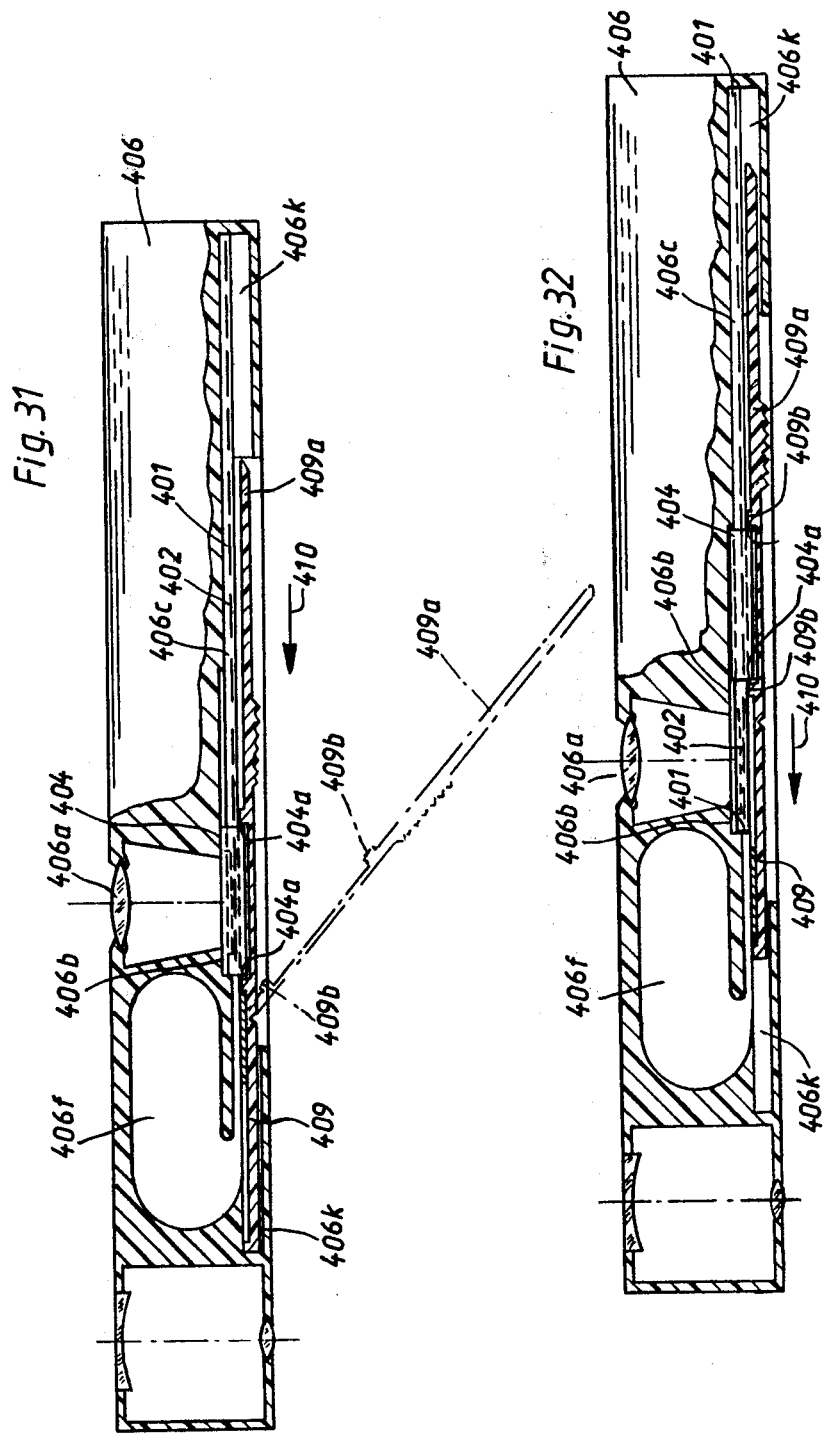

FILM CASSETTE AND METHOD OF MAKING THE SAME

BACKGROUND OF THE INVENTION

The present invention relates to a film cassette and more particularly to a film cassette which is suitable for receiving a multi-exposure film strip.

The invention also relates to a camera suitable for cooperative use with the film cassette.

Further, the invention relates to a method of making the film cassette.

The most common type of camera are the rollfilm cameras, i.e., still cameras which are available for different types of films, for example, 135-films, 126-films, or 110-cassettes or else roll film on spools. All these cameras have the disadvantage that the sets of spools which carry the unexposed film are relatively large, particularly relatively thick because of the large-diameter film coil which they contain. It is therefore very difficult to carry along a substantial supply of such film, for example on a trip. Moreover, once the film has been exposed, it is not easy to send away, for example, to developing laboratories, and relatively large shipping bags are used which often will not fit into conventional mail slots and are relatively heavy and therefore require additional postage. The same problems are attendant upon a film cassette which has been proposed in German Pat. No. 877,545.

Another proposal has been made in German Published Application No. 2,809,780 which relates to a photographic system in which the light-sensitive film is constructed as a round disc and is accommodated in a flat round cassette in which it is turnable about the center axis of the disc. In this system the cassettes are relatively thin and can be stacked quite readily. However, they are relatively light and therefore a camera which uses this type of cassette must be rather large in relation to the individual picture frame. Moreover, these film discs cannot be developed and copied in the highly expensive developing and copying equipment which is conventionally available in developing laboratories, so that special machinery must be purchased or expensive adapters must be obtained to be able to handle these films.

Another system of film, cassette and camera has been proposed in the magazine "Research Disclosure" December 1978, page 17. In this proposal an elongated film strip is used which is accommodated in a flat elongated cassette of paper which is opaque to light. The cassette paper has a light-tight fold extending over the entire length of the film strip and the cassette can be opened along sequential portions of the fold to permit exposure of a portion of the film, whereupon the fold is subsequently closed again. For this purpose the film together with the paper cassette is transported through the exposure station of the camera, but without the film undergoing any movement relative to its cassette. While this system uses a film cassette which can be readily stacked and which is narrow, the construction of the fold in the cassette which must be light-tightly closed, must be capable of being opened at different locations, and must be capable of being light-tightly reclosed, is relatively complicated. Moreover, cameras for use of such cassettes must necessarily have rather complicated devices for the sequential opening and closing of the paper fold. In addition to the expense involved due to this, there is also the fact that the cameras must be comparatively large because there must be sufficient space available before and after the exposure station to accommodate the equipment for opening the fold and subsequently reclosing it.

SUMMARY OF THE INVENTION

It is, accordingly, an object of the present invention to provide an improved film cassette for a light-sensitive multi-exposure film strip.

More particularly, it is an object of the invention to provide such a film cassette which avoids the disadvantages of the prior art, is as flat as possible and permits the storage or accommodation of a number of such cassettes in narrow and thin (i.e. low-height) stacks.

An additional object of the invention is to provide a camera for use with a film cassette of this type.

A further object of the invention is to provide a method of making such a film cassette.

In keeping with these objects and with others which will become apparent hereafter, one feature of the invention resides in a film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film therethrough, and means for sealing the opening against the entry of light into the pocket.

The invention has a variety of advantages. It provides a film cassette which requires very little space so that it can be readily carried along in many copies without requiring much storage space and can also be readily sent through the mail for purposes of developing and copying. In addition, the cassette is extremely simple and is therefore particularly inexpensive to produce and to sell. The camera for use with the cassette is also simple and inexpensive, particularly with respect to the equipment for insertion of the cassette as well as with respect to the guidance and transportation of the film. Despite this, the camera has small overall dimensions. The cassette can use film of the conventional type, i.e., a film strip, so that the film can be readily developed and copied, and in the type of developing and copying equipment which is universally available in film processing laboratories.

The novel features which are considered as characteristic are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective, partly broken-away view of an embodiment of a film cassette according to the invention;

FIG. 2 is a perspective view showing the film used in the cassette of FIG. 1;

FIG. 3 is a side view of a different embodiment of the cassette;

FIG. 4 is a perspective view, partly broken away, of a further embodiment of the novel cassette;

FIG. 5 is a section through the cassette shown in FIG. 4;

FIG. 6 is a section similar to FIG. 5, but illustrating an additional embodiment;

FIG. 11 is a perspective view of a further cassette according to the present invention, showing the cassette prior to exposure of the film;

FIG. 12 is a view similar to FIG. 11 but showing the cassette after exposure of the film therein is completed;

FIG. 23 is a perspective view, partly broken away, showing a cassette according to the invention in a first stage of making the same;

FIG. 24 is a cassette of FIG. 23 in a second stage of making;

FIG. 25 is a fragmentary perspective view showing a completed cassette;

FIG. 26 is a fragmentary view showing a cassette made according to another embodiment of the method of the invention;

FIG. 31 is a partly sectioned view of a camera for use with the cassettes of FIGS. 27, 29 and 35-37, showing it in broken lines in open position and in solid lines in the position which it assumes immediately after insertion of the cassette;

FIG. 32 shows the camera of FIG. 31 in the closed position in which it is ready to make exposures;

DESCRIPTION OF THE PREFERRED EMBODIMENTS

Figure 7:
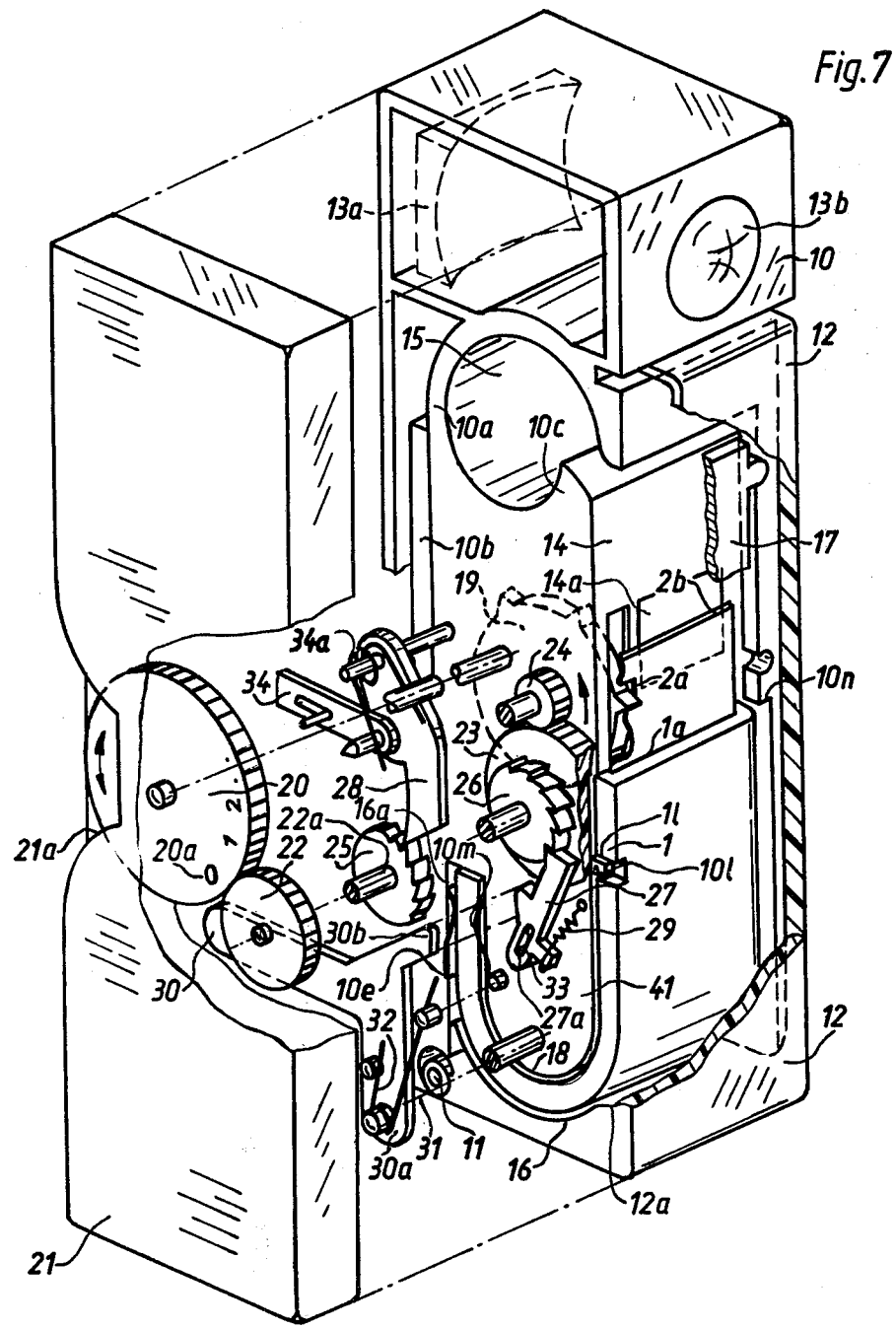
FIG. 7 is a perspective view partly in section and partly broken away, illustrating parts of a camera using the type of cassette shown in FIGS. 1-6.

Referring now to the drawing, and firstly to FIGS. 1-5, it will be seen that the film cassettes illustrated therein are composed of elongated pockets 1 which are thin in relation to their length and width and which are provided at one narrow side with an opening, such as a slit 1a through which the film strip 2 accommodated in the pocket extends. The film strip 2 is somewhat longer than the elongation of the pocket 1 and is preferably provided with a perforation 2a for each film frame, the perforations being arranged along one of the longitudinal edges of the film strip. However, it is of course also possible to provide two or more perforations for each film frame on the film strip 2. The means to be used in an associated camera for film transportation and film positioning, e.g., film clipper or perforation-engaging sprocket wheel, depend upon the type and arrangement of the film perforations utilized on the film strip 2.

In order to permit the accommodation of as many film frames as possible on a relatively short film strip 2, it is advantageous to so configurate the perforations 2a and the camera to be used in conjunction with the film cassette, that the wide sides of the individual pictures extend parallel to the narrow sides of the film strip 2. This is, however, not absolutely necessary since in principle it is possible to use a quadratic picture format or a format in which the wide sides of the film frame extend parallel to the longitudinal side of the film strip.

As mentioned above, the cassette is in form of a pocket 1. This is composed of material which is opaque to light, for example, paper such as is used for packaging film cartridges, or extensions (i.e. allonges) or the like. Otherwise, a synthetic plastic material may be used which again is opaque to light, and which is protected against electrical charging for example by metalizing the inner side of the pocket. Any of these materials may be used to produce a pocket 1 which is so flat that it is hardly thicker than the thickness of the film strip 2 itself.

It is evident that the pocket 1 must be long enough to accommodate lengthwise the film strip 2 which is to be subsequently exposed. In addition, the pocket must be flexible, particularly in its longitudinal direction. To increase the flexibility of the pocket in those areas which may need to be curved, while in use in a camera, the pocket may be provided at these areas in one or more of its two flat sides with transverse grooves 1b or with folds extending transverse to its elongation which can be pushed together or pulled apart in the manner of a bellows when the pocket is curved, as indicated in FIG. 1. This measure, incidentally, can in principle be used with all other pockets which are to be still disclosed hereinafter.

FIGS. 1 and 2 illustrate the simplest embodiment of a cassette according to the invention. Here, the pocket 1 is provided with the aforementioned slit 1a through which the lead end 2b of the film strip 2 extends. The slit 1a is provided with a lining of light-sealing strips 1c, for example of felt, between which the film end extends outwardly of the pocket. To prevent the film end 2b from acting as a light guide which directs light into the pocket and thus spoils portions of the film strip 2 therein despite the presence of the seals 1c, the portion 2b of the film strip may be provided with a known raster or similar means. A light-tight layer of lacquer may be sprayed over the exposed film end 2b, or a layer of protective paper or the like may be adhered to it. It is, however, also possible to replace the film end 2b with an opaque paper leader if so desired. This measure, also, is in principle suitable for use with all pockets 1 and film strips 2 to be disclosed hereinafter.

When pressure is exerted against the narrow sides of the film cartridge, e.g., on insertion or removal from the camera, it might readily be possible for the slot 1a and the light-sealing strips 1c to gap apart from one another and thus to permit the entry of light into the pocket 1. To avoid this, the slot 1a with its strips 1c is pressed together by a rigid bracket 5 which surrounds the edge of the pocket 1 which is located adjacent to the slot 1a, and is of approximately annular configuration. It is advantageous if this bracket 5 is of metal and at the same time can serve as an abutment to cooperate with the step 10a for positioning the cassette in the camera, as will be discussed with reference to FIG. 7.

The film end which is trailing in the direction of film withdrawal from the pocket has a double projection 2c as shown in FIG. 2 which is high enough so that in the course of film strip withdrawal from the pocket 1 it abuts against the light sealing strip 1c and thus prevents complete withdrawal of the film strip from the pocket 1 so that the trailing film end will always remain in the pocket.

Adjacent the slot 1a, and again adjacent the other closed end, the pocket 1 is provided with respective grooves 1d, 1l which are adapted to cooperate with spring-biased projections 10d, 10l in the camera so as to retain the cassette in the camera in a predetermined position. These grooves and projections may also be arranged at that edge of the pocket 1 which is closer to the film perforation 2a, rather than at the opposite edge as shown.

To prevent an undesired withdrawal of the film end 2b from the pocket 1 prior to insertion of the cassette into a camera, a seal 4—optionally provided with a tear strip or tear region 4a—may be glued over the film end 2b and the adjacent portion of the pocket 1. This seal 4 has the additional function of indicating, when torn, by a visual signal to the user that the film strip in the cassette has already been exposed and thus warning the user against erroneously re-inserting it into a camera.

A modification of the embodiment of FIGS. 1 and 2 is illustrated in FIG. 3, wherein the sealing of the opening 1a is effected not by means of sealing strips, but by means of elastic lips 1k surrounding the opening 1a and engaging the film end 2b. The lips 1k are also pressed towards one another and into contact with the film by a rigid bracket 5 as in the preceding embodiment.

The embodiments in FIGS. 4-6 are somewhat more complicated than those in FIGS. 1-3. In particular, they utilize a different light-tight seal for the slot 1a in that they have a cap 3 provided on the film 2b and consisting of elastic material which is not light-transmissive and which is placed over the open end of the pocket. According to FIG. 4, the cap 3 is provided preferably at its narrow sides—with folds 3e so that it can be folded together and can, when the film is advanced in a camera, readily pass between the film window and the film pressure plate. FIG. 5 shows that in addition to or in lieu of the strips 1c the pocket 1 may be provided with light sealing strips 3c at the inner walls of the cap 3. The strips 3c may be felt and wedge-shaped, so they form a funnel opening towards the pocket and thus facilitate the placing of the cap 3 onto the pocket 1.

With reference to the cross-sectional dimensions of the pocket 1, the cap 3 is so dimensioned that it sits relatively firmly on the pocket 1 and a certain force is required to pull it off the pocket 1. This protects the film and the pocket against inadvertent exposure to light be unintentional withdrawal from the pocket.

If it is desired to provide a clamped seat of the cap 3 on the pocket 1 and to further improve the light seal, then—as shown in FIG. 6—the inner walls of the cap 3 may be provided with ribs 3b which extend into grooves 1m of the pocket 1 with a springy engagement and provide in effect a labyrinthine light seal.

As shown in FIG. 4 the pocket 1 may, in addition to the already described means for obtaining a clamped seat or in lieu of such a clamped seat—be provided with a portion 1i which springely engages into a corresponding recess 3f of the cap 3 when the cassette is closed. This blocks the cap 3 against unintentional withdrawal from the pocket 1 and thus protects the film against unintentional exposure due to inadvertent pulling of the film from the pocket. On insertion of the cassette into a camera this blockage is overcome in that a tooth of a film transporting wheel or gripper in the camera, or a projection of the camera which may e.g. be operated when the rear cover of the camera is closed, presses the portion 1i out of the recess 3f so that film thereafter can be withdrawn from the cassette. After the complete restoration of the film back into the pocket 1, the projection 1i can snap back into the recess 3f so that the film again will be protected against exposure to light when the cassette is removed from the camera. It goes without saying that it is also possible to use two of the projections 1i and corresponding recesses 3f in a symmetrical arrangement, particularly if the disengagement of the projections 1i is effected by portions of the camera. In addition, these embodiments may also be provided with a seal 4 (optional tear region 4a) which is glued over the edge 3a of the cap 3 and corresponds in its effect and operation to the seal 4 discussed with respect to the embodiment of FIG. 1.

Figure 8:
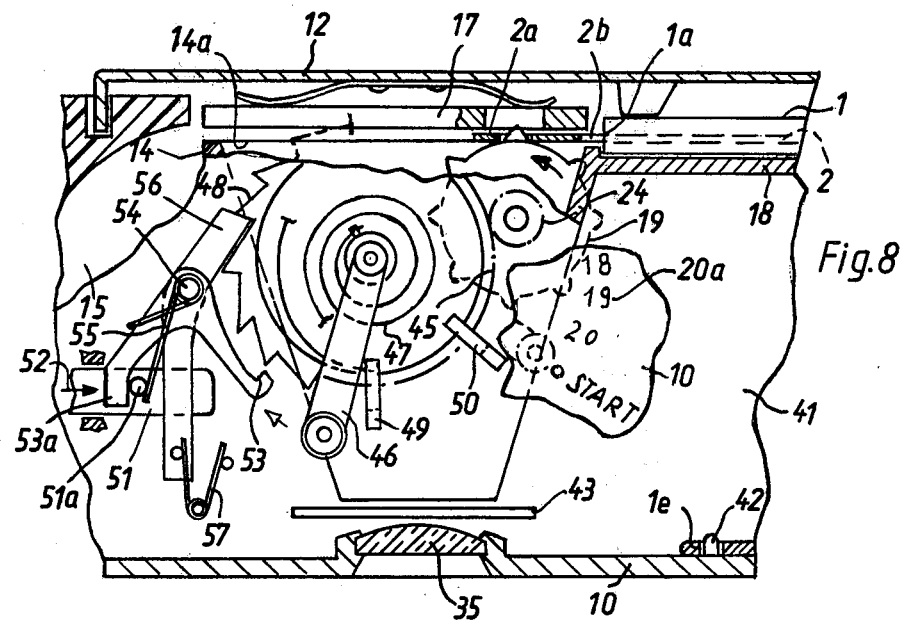
FIG. 8 is a top-plan view, partly in section, of another embodiment of a camera for use with the novel cassettes.

In FIG. 4 the portion 2c of FIG. 2 is replaced with an additional perforation hole 2d in film end 26 which is located outside the track of the normal film transportation perforations 2a, and this hole 2d engages—during withdrawal of the film 2 from the pocket 1—with a tooth 1h provided on an inner wall of the pocket so as to prevent the film strip 2 from complete withdrawal out of the pocket. Such means may, however, be avoided if the transportation devices in the camera itself—e.g., as shown in FIG. 8—are so constructed that the withdrawal of the film strip 2 from the pocket 1 is terminated early enough so that the film end remains in the pocket under all circumstances.

Figure 9:
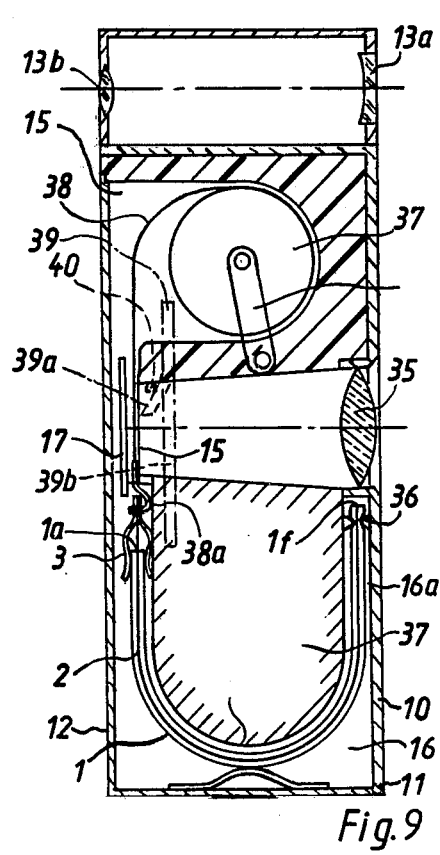
FIG. 9 is a somewhat diagrammatic fragmentary section of a further embodiment of a camera for use with the novel cassette.
Figure 10:
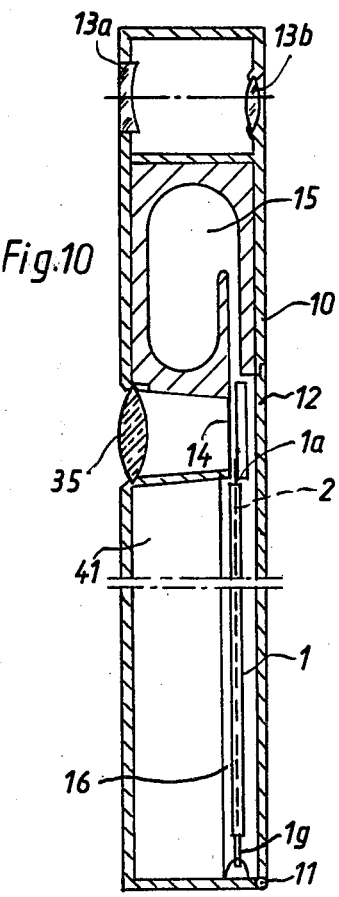
FIG. 10 is another diagrammatic section, illustrating an additional embodiment of a camera for use with the novel cassette.

The securement of the positioning of the pocket 1 in the camera can be effected, in place of the recess 1d of FIG. 1, with an eye 1e as shown in FIGS. 4-6 at the trailing end of the pocket, a bead 1f as shown in FIG. 9, or a hook 1g as shown in FIG. 10, all of which collaborate with corresponding portions of the camera (either hooks, grooves or eyelets) when the cassette is inserted into the camera.

The film perforation 2a associated with the respective film frames is also provided in the film end 2b as shown in FIGS. 1–3, or else in the cap 3 in form of an additional perforation 3d (FIGS. 4–6). The spacing of the additional perforation 3d from the perforation 2a associated with the first film frame corresponds to the spacing of the individual perforations 2a from one another. After insertion of the cassette into a camera provided for use with it, the film transporting devices of the camera can engage in the additional perforation 3d in the film end 2b or in the cap 3 so as to effect a withdrawal of the film strip 2 from the pocket 1 until the further transportation of the film is effected via the normal film perforations 2a. Of course, the additional perforation 3d in the film end 2b respectively in the cap 3 must also be sealed against the entry of light into the interior of the pocket.

Coming now to FIG. 7 it will be seen that this illustrates an embodiment of a camera which is for use with the cassette of FIG. 1, but which can also be used with a cassette according to FIGS. 3–6. The camera housing 10 has an inner body 10a, a plate 10b carrying the not-illustrated camera shutter, and a cassette chamber cover 12 which is pivotable about a shaft 11 mounted on the housing and covering the underside and an essential part of the reverse side of the rear side of the camera. Above the cassette chamber is located a viewfinder 13a, 13b. A film container 14 with the film window 14a is arranged centrically with respect to the not illustrated camera lens and below viewfinder 13a, 13b there is provided an essentially cartridge shaped storage space 15 for the exposed film 2 (it does not contain a film take-up spool). A cassette chamber for accommodating a film pocket is identified with reference numeral 16 and a film pressure plate 17 is shown only in part.

A mounting plate 10c of the camera body 10 is visible and serves to support the film transporting mechanism; also visible is the wall which bounds the space 15 and the wall 14. The inner camera body 10 is bounded in the direction towards the space 16 by a wall 18 which is normal to the plate 10c and which extends from the front side via the underside to the camera rear side in a U-shaped configuration. Preferably, the wall 18 extends over the entire width of the cartridge 1 and serves as a guide for insertion of the cartridge 1 into the camera and for its retention in the camera. With reference to the cassette space 16 the cover 12 is also bounded by a wall 12a of U-shaped configuration which, when the cover 12 is closed, has an approximately constant spacing from the wall 18 so that the chamber 16 has the configuration of a curved channel. Its width is slightly greater than the thickness of the cassette so that the cassette 1 can be accommodated in it, but on the other hand is protected in all directions against bending and deformation.

The wall 10e of the housing 10 and the wall 18 of the inner camera body 10a form adjacent the camera front a duct 16a at the walls of which there are respective leaf springs 10m facing towards the interior of the duct. In place of these it is also possible to arrange in the duct 16a a springy projection 10l (see FIG. 1) which cooperates with the groove 1l of the cassette 1.

To insert the cassette 1 into the camera 10 the cover 12 is opened and pivoted about the axis 11 away from the under and rear side of the camera 10, so that the duct 16a becomes readily accessible. The end of the cassette 1 which is trailing as considered in the film transport direction is inserted into the duct 16a until it reaches the bottom of the duct. The springs 10m clamp the end portion of the cassette 1 in the duct 16a, so that during the further insertion of the cassette the latter cannot fall out or shift and is retained in its position during the film transport. Thereafter, with the cover 12 still open, the portion of the cassette which extends out of the duct 16a is bent in a bow against the wall 18 and in so doing the recess 1l at the leading end of the cassette engages with the projection 10l of the camera. The cassette 1 is now held against shifting in its longitudinal direction during transportation of the film out of, and subsequently back into the cassette. The projection 10l and a step 10a which is provided on the housing adjacent the wall 14, are so dimensioned that on engagement of the projection 10l into the recess 1l the step 10 forms an abutment for the end face of the cassette 1. The perforation hole 2 of the film end 2b extending out of the camera 1 is now hooked into that tooth of the sprocket wheel 19 which projects from the wall 14 and the cassette is now ready and in a position in which the film strip 2 can be transported out of and back into in the pocket by means of the film transporting mechanism of the camera. The camera cover 12 is now closed so that its wall 12a serves to bound the cassette chamber and the cassette 1 is guided and additionally protected against shifting, bending and other deformations. Due to the curved arrangement of the cassette space 16 the height of the camera can be retained small despite the length of the cassette 1.

During the first film transport the film end 2b or the leader used in lieu of it, is moved—after the portion 4a of the seal 4 has been ripped—in the direction towards the space 15 until the first film frame becomes located opposite the film window 14a. During successive picture taking the film strip 2—or rather its successive film frames—is increasingly exposed and transported stepwise into the space 15 where it forms a loose coil. After the last exposure has been taken the portion 2a or the perforation 2d cooperating with the tooth 1h prevents further film transportation, and thereupon the direction of rotation of the sprocket wheel 19 is reversed and the film strip 2 is transported back into the pocket 1.

To obtain these functions a gear transmission 22, 23 and 24 is provided between the film transporting bottom 20 which is manually operable and freely accessible partly in a depression 21a of a camera side wall 21 and the sprocket wheel 19. The gear 24 is connected so as to rotate with the sprocket wheel 19 and meshes with the gear 23. This gear, in turn, is coaxially mounted on the gear 22 with which it turns, together with two blocking gears 25, 26 all being arranged on a shaft 22a. The gear 22 meshes with teeth of the film transporting button 20. The blocking teeth of the gear 25 are so directed that by engagement of a pawl 27 before a tooth flank, a turning of the knob 20 and therefore of the sprocket wheel 19 counter to the clockwise direction, i.e., according to the film transporting direction, is not possible. The blocking teeth of the gear 25 are directed in a contrary sense so that by engagement of the pawl 28 a turning of the knob 20 and of the wheel 19 in clockwise direction, i.e., in the direction in which the film is transported back to the pocket 1, is impossible. If both pawls 27 and 28 are in engagement with their respectively associated gears 26 and 25, then the knob 20 is blocked against movement in either direction.

The pawl 27 has an elongated holes 27a by means of which it is mounted on a shaft 33; it is pulled against the wheel 26 by a spring 29. The release lever 30 is triple-armed and projects from the front side of the camera so that the user can operate it with the index finger of one hand. The second arm 30a of the lever is journalled on a shaft 31 and is engaged by a restoring spring 32. If the lever 30 is moved in clockwise direction, then it releases—in a known manner and thereore not illustrated, e.g., via its arm 30b—the not illustrated shutter of the camera. At the end of the shutter release movement the arm 30b moves the pawl 27 counter to the action of the spring 29 so that it comes out of engagement with the gear 26. Since during this movement the pawl 27 shifts with its elongated opening 27a under the effect of the spring 29 relative to the axis 33, it can no longer engage the same tooth on release of the arm 30a, but can only engage the inclined flank thereof. Thus, the film transporting knob 20 and the sprocket 19 have now been released for rotation counterclockwise, by one transporting step. After one complete transporting step the pawl 27 drops back in front of the next blocking tooth of the gear 26 and the pawl 27 is returned back to its starting position counter to the effect of its spring 29.

Thus, a film transportation increment is determined by the angular displacement of the gear 26 corresponding to one tooth. The transmission 20, 22, 23, 24, and the sprocket wheel 19 may be so constructed that when there is one perforation 2a per film frame, the tooth of the sprocket wheel advances the film by an increment corresponding to one film frame. If more than one perforation is present per film frame, advancement of the gear 26 by one tooth could also effect a turning of the sprocket wheel by as many teeth as there are perforations provided per film frame. After the next-following actuation of the release 30, a further film transport step is possible, until the last portion of the film strip which is available for exposure appears in the film window 14a and the film strip is blocked against further transportation.

When the film strip has thus been fully exposed, it must be pushed back from the space 15 into the pocket 1. For this purpose, the slide 34 which projects from the front plate of the camera is pushed inwardly by the user against the pawl 28 so that the same is maintained out of engagement with the gear 25. As long the slide 34 which is biased by a restoring spring 34a acts upon the pawl 28, the film transporting knob 21a can turn the sprocket wheel 19 in clockwise direction so as to effect pushing of the film strip 2 back into the pocket 1. After the film strip 2 has been fully pushed back into the pocket 1 the cassette can be removed from the camera after opening of the cover 12. The torn seal 4 indicates to the user that the film in the pocket has been exposed and thus protects the user against inadvertent renewed insertion into the camera and possible double exposure.

In its normal rest condition—i.e. when it is not in the camera—the pocket is flat. Therefore, it can readily be stacked together with a number of other pockets and accommodated in a briefcase or lady's pocketbook or else can be sent in a normal mailing envelope to a developing or copying laboratory.

Because the film transport knob 20 always is turned through equal angles during each film frame advancement because of the constant length of the film strips, it is possible to provide a film counter 28 directly on the knob 20, which can then cooperate with a starting mark (not shown) on the camera side wall 21 to indicate how many film frames have been exposed respectively how many are still to be exposed.

FIG. 8 shows those portions of the camera which are necessary for an understanding of the invention, the camera being intended for use with the type of cassette illustrated in FIGS. 1-6 and having a spring drive for the film transport. Like elements are identified with the same reference numerals as FIGS. 1-7. In addition, there are diagrammatic illustrations of the lens 35 and of the camera shutter 43 in FIG. 8.

The gear 24 is connected with the sprocket wheel 19 and meshes with a gear 45 to which a crank 46 is fixedly connected. One end of a spring 47 of the spring drive is connected to the crank 46 and a blocking gear 48 is connected with the gear 45 and has inclined tooth flanks which permit a turning in clockwise direction, corresponding to a rotation of the sprocket wheel 19 in counter-clockwise direction and a transportation of the film 2 out of the pocket 1 and into the storage space 15. The other end of the spring 47 is connected to an abutment 49 provided on the camera. The crank 46 is turnable between this abutment 49 and a further abutment 50 which is also provided on the camera.

The camera release 51 is constructed as a slide and when moved in the direction of the arrow 52 an arm 53a of a blockinglever 53 which is turnable about an axis 54, is moved behind a pin 51a under the biasing action of a spring 55. In the rest position of the release 51 the arm 53 is disengaged from the blocking gear 48. A second blocking arm 56 is journalled on the shaft 54 and engages a tooth of the blocking gear 48 under the influence of a biasing spring 57.

When a cassette 1 is placed into the camera of FIG. 8 and the cover 12 is closed, the crank 46 is turned in clockwise direction from abutment 49 against abutment 50. The transmission ratio between the gear 45 and the gear 24 is so selected that during this movement the sprocket wheel 19 pulls the film end 2b out of the pocket 1—in the process breaking the seal 4—and transports the total available film length of the film strip 2 continuously into the space 15 but without pulling the film end out of the opening 1a. Thus, an arrangement for preventing the removal of the film end from the opening of the pocket 1 is not necessary for a cassette used in this camera. Once the film strip 2 has been pushed into the storage space 15 and the crank 46 engages the abutment 50, the spring motor 47 has been tensioned but is prevented from discharging energy by the presence and action of the pawl 56.

When thereupon the slide 51 is moved in the direction of the arrow 52, the lever 53 follows it in counterclockwise direction and is slightly ahead of a radial tooth flank of the gear 48. Shortly thereafter the lever 56 is lifted off the gear 48 by the pin 51a, so that the gear can now turn through a small angular distance under the influence of the spring 47 of the spring guide, until the aforementioned radial tooth flank engages the lever 53. During this movement film transportation does not yet take place. If, however, the release 51 is disengaged, the lever 56 can no longer drop in ahead of the tooth flank where it was located when the release began, but can only contact the subsequently following inclined surface of the gear 48. Since on release of the release member 51 the lever 53 has been lifted off again from the gear 48 under the influence of a not illustrated with-drawing spring acting upon the release 51, the spring motor 47 together with the gear 48, the gear 45 and the crank 46 now advances by a distance corresponding to one tooth of the gear 48, in counterclockwise direction. The arrangement of the teeth on the gear 48 is such that during this movement the sprocket wheel 19 pushes the film strip 2 from the storage space 15 back into the pocket 1 by a distance corresponding to one film frame.

If a cassette 1 is used having a cap 3, the force of the spring drive 47 and its working distance between the abutments 50 and 49 must additionally be so selected that the sprocket wheel 19 engaging in the perforation 3d can initially pull the cap 3 off from the pocket 1 and subsequently press it firmly back onto the pocket 1 so as to light-tightly reclose the same. The latter can be effected either by having the raster 1m, 3b of FIG. 6 engage and/or by pushing the strips 3c over the beginning of the pocket according to FIG. 5. Pushing of the strips 3c onto the pocket is facilitated if these strips are arranged in funnel shape relative to the pocket 1 as described with reference to FIG. 5. The crank 46 together with the marks 20a serves as a film counter in this embodiment.

Principal arrangements for other camera constructions are illustrated in FIGS. 9 and 10. Again, like elements are identified with like reference numerals as in FIGS. 7 and 8.

In the embodiment of FIG. 9 the cover 12 is anchored in accordance with the embodiment of FIG. 7, as in the embodiment of FIG. 10 it need only extend over the reverse side of the camera.

The pocket end in the embodiment of FIG. 9 is provided with an enlarged portion 1f holding it in a groove 36 of the duct 16a. In the storage space 15 there is provided a take-up spool 37 which is turnable by a crank 46 mounted on its axis and connected with a band 38, a hook 38a of which can be hooked into a perforation of the film end 2b or of the cap 3. When the spool 37 is turned in clockwise direction via the crank 46, the seal 4 tears along the portion 4a. The film end 2b or the cap 3 and the film strip 2 are taken up onto the spool 37 until the elements 2c or 2d, 1h prevent a further movement of the film strip 2 out of the pocket 1 i.e., prevented from being fully pulled out of the pocket. The sequential exposure of the individual film frames thereupon takes place during the stepwise returning of the film strip 2 into the pocket 1. For this a known transport slider 37 with a springy gripper 39 can be utilized, which is slidable by the user in a slotted guide 39b and which, on operation and movement in direction downwardly engages in the film perforation 2a and can be moved back into a position—on take-up of the film strip on the spool 37—in which the gripper 39a is lifted off the film strip 2 by a pin 40.

In the embodiment of FIG. 10 the pocket 1 is arranged fully stretched in the cassette space 60. This means that the camera 10 will be longer than in the other embodiments since the pocket 1 is no longer curved; on the other hand, the camera will however also be flatter. Accordingly, the storage space 15 is still essentially cartridge shaped but configurated in cross-section as an elongated oval. Free camera spaces 41 next to the cassette space 16 or within the rounding of the cassette space 16 may be utilized for accommodating such camera parts as batteries, components for driving the camera shutter, and the like.

A further embodiment of a film cassette 6 is illustrated in FIGS. 11 and 12, but of course not in its actual size. Nevertheless, the embodiment of FIG. 6 has approximately twice the length of the film strip 7 which is to be accommodated in it. One of its flat sides is provided, approximately at its middle, with an exposure window 6a the slots 6b of which extend transversely and parallel to the elongation of the strip 7 and which are closed by light sealing means with respect to the remainder of the pocket 6 in a known manner. The non-exposed film strip is accommodated in one half 6g of the pocket, i.e., in the right pocket half as shown in FIG. 11. A lader 7a of the film strip is located in the exposure window 6a and has a perforation 7b. The leader 7b may be provided with a raster of the film or else with a light-tight lacquer coating so as to be non-light guiding, or it may be of appropriate paper. In addition, subsequent to the last film frame the film strip 7 has a light-opaque or non-light guiding trailing portion 7c. The inner side of the pocket or the trailing portion 7c facing towards the exposure window 6a may be provided with a marking 6c indicating that the film strip 7 has been exposed.

In this embodiment of the pocket the exposure window 6a of the pocket 6 is aligned with the film window 14a of the camera and after the camera is closed, the film transporting mechanism causes—during the first film transport—the leader 7a to move into the free pocket portions 6f (the left one in FIGS. 11 and 12). Thereupon, an exposure of the film section located in the exposure window 6a alternates in the usual manner with a film transporting step, and the now exposed film section is pushed into the free pocket portion 6f. Finally, only the trailing portion 7c is located in the exposure window 6a. The perforation 7b' associated with the trailing portion 7c is so arranged that the film transport mechanism is not able to fully push the trailing portion 7c into the left-hand pocket portion which accommodates the exposed film, so that the trailing portion 7c acts as a light seal in cooperation with the already provided light sealing means. The pocket 6 can now be removed from the camera without having to return the film to its original position. Pockets containing exposed film strips are clearly differentiated from new pockets containing non-exposed film strips by the visibility of the marking 6c which becomes exposed in the film exposure window 6a when the film has been fully transported from one side of the pocket to the other.

Since the pockets 6 are approximately twice as long as the film strips 7, it is necessary to provide for the possibility of folding the pockets so that they can be taken along in normal briefcases or can be mailed in normal envelopes. For this reason, the pocket is provided ahead of and behind the exposure window 6a with folding areas 6d and 6e which extend transverse to the elongation of the pocket and are formed by grooves, depressions or other reductions in the material thickness of the surface having the exposure window, or else folds in the back wall of the pocket. The folding area 6d located laterally adjacent to the window 6a in the pocket portion 6f for the non-exposed film strip, serves for folding of this left pocket portion 6f so that pockets containing non-exposed film can be folded. It is located not only next to the exposure window, but also next to the end of the leader 7a, so that during folding the film strip 7 is not bent. Conversely, the folding area 6e for folding the now empty right-hand pocket portion 6g which previously contained non-exposed film, is located to the right next to the film exposure window 6a so that when this pocket portion 6g is folded, the film strip 7 is again prevented from being bent. The folding position for pockets with non-exposed film strips is illustrated in broken lines in FIG. 11 and for pockets with exposed film strips it is illustrated in broken lines in FIG. 12. The pocket surfaces may also be provided with grooves or folds 6h in order to increase their flexibility.

Figure 13:
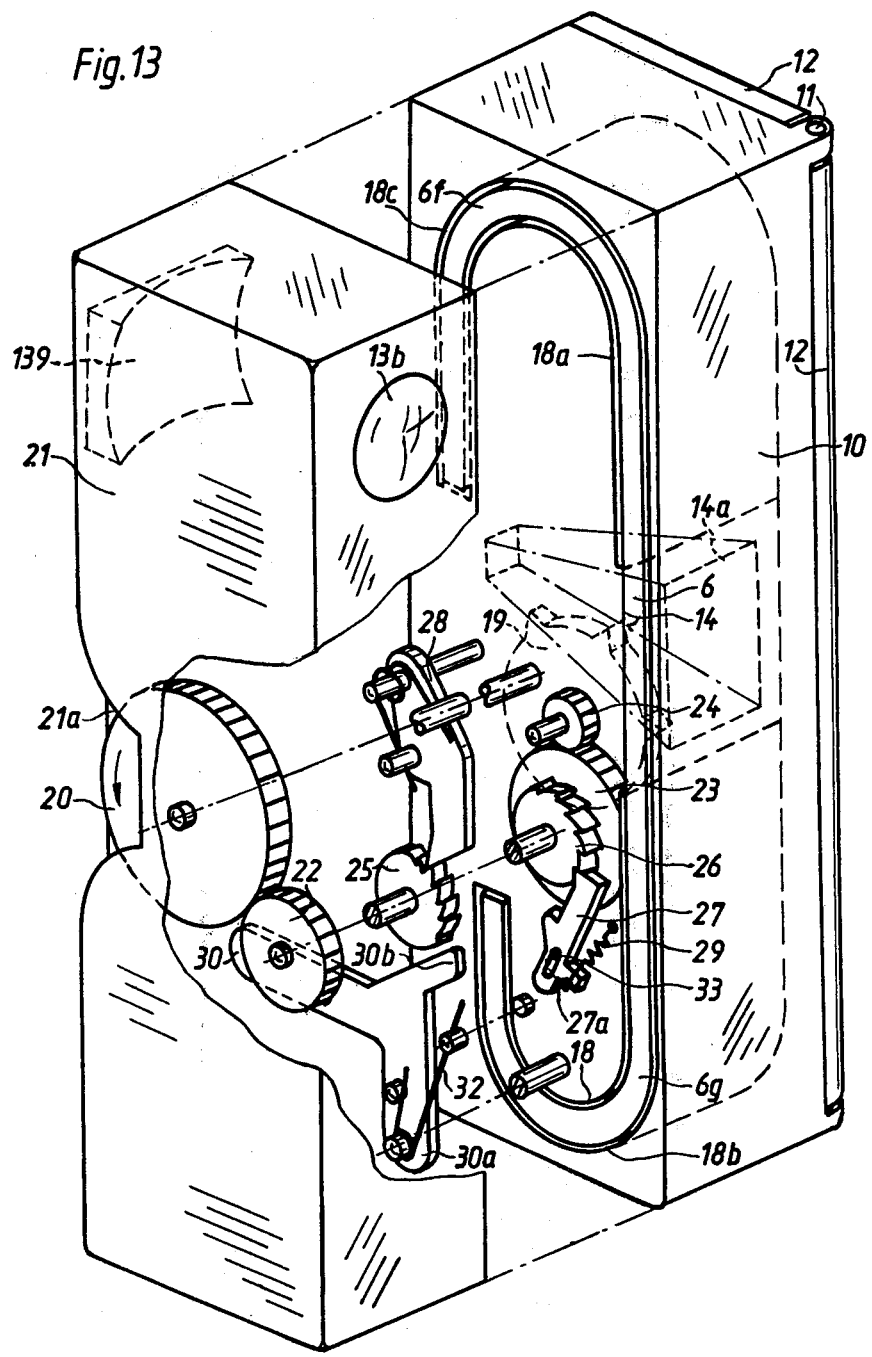
FIG. 13 is a view similar to FIG. 7, but illustrating a camera for use with the cassette of FIGS. 11 and 12.

FIG. 13 shows a camera which is suitable for use with a pocket 6. The camera according to FIG. 13 contains certain elements which are the same as corresponding elements in FIG. 7, and hence the same reference numerals have been used to designate these.

When using a film pocket 6 the film strip 7 is transported from the pocket portion 6g into the pocket portion 6a and is not returned; because of this the reverse slide 34 of the embodiment of FIG. 7 is not needed in FIG. 13. In lieu of it, however, the film transporting knob 20 and the sprocket wheel 19 are constantly blocked via the gear 25 and the pawl 28 against rotation in a direction counter to the film transporting direction. A turning in the direction effecting film transport is, however, possible in accordance with the embodiment of FIG. 7 after each operation of the release 30.

The embodiment in FIG. 13 differs from that in FIG. 7 also in that the camera cover 12 extends over the rearward side part 2 of the camera, i.e., extends normal to the film window 14a and is turnable about an axis extending parallel to the film transporting direction. Also, in addition to the guide wall 18 for the pocket portion 6g there is provided the same or an analogous side wall 18a for pocket half 6f which accommodates the exposed film. Both guides 18 and 18a have associated with them—outwardly spaced therefrom—further guides 18b and 18c so that a pocket 6 which is inserted into the camera 10 is guided in two ducts 18, 18b and 18, 18c in respective curves at opposite sides of the film window 14a. It is advantageous to have the camera cover 12 located at the reverse side of the camera housing 10 and to insert the pocket 6 from there laterally into the ducts. To secure the pocket 6 in its proper position in the camera, coordinated projections or portions on the pocket and the camera may be provided, for example such as fixing pins on the camera and recesses in the pocket into which these pins engage, as well as already described means for securing the two pocket ends in the camera against movement.

To assure the presence of an open film passage in the pocket it may be advantageous to provide the pocket 1 or 6 with spaces 8a, 8b according to the embodiments in FIGS. 14-17. The size relationships in these Figures are not to scale, and to some extent are exaggerated to provide for a better illustration. The spaces 8a and 8b are barely higher than the thickness of the film and are located laterally of the film path for the film strips 2 or 7 and the pocket 1 or 6, respectively, so that they simultaneously also act as lateral film guides and assure the maintenance of a free film path or channel even in the arcuately curved portions of the pocket 106.

Figure 14:
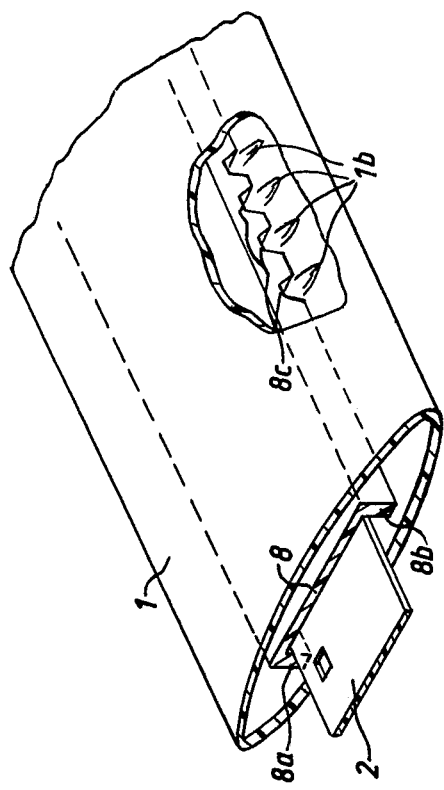
FIG. 14 is a fragmentary, partly sectioned detail view, showing a component of another cassette according to the present invention.

The spaces 8a and 8b may be connected, as shown in FIG. 14, by a guide 8 extending parallel to the flat side of the film strip 2 and may be inserted as a unit into the pocket 1. This unit 8, 8a, and 8b may for example be connected with the ends of the pocket 1. To assure that this unit which serves for spacing and film guidance can be arcuately accommodated in the camera together with the pocket 1, it may be advantageous for the spacers 8a and 8b to be provided with grooves 8c at the locations which are to be bent. These grooves may be trapezoidal or triangular so that on bending of the pocket 1 their inclined edges can move towards one another. The pocket 1 into which the guidance unit 8, 8a and 8b is inserted should have a certain elasticity not only in longitudinal direction but also in direction transverse to the length of the pocket so that the flat sides of the pocket can outwardly bulge in somewhat convex shape about the guide 8, 8a and 8b. These convex bulges are strongly exaggerated in FIGS. 14-17 to more clearly illustrate the point. In actual practice they are hardly noticeable due to the small thickness of the film and the small height of the spacers 8a and 8b, and in no way detrimentally influence the flat shape and the stackable characteristics of the pockets 1 and 6.

The guidance unit 8, 8a and 8b which is also of flexible material assures that when the pocket 1 is flexed and the film strip 2 is withdrawn, the pocket surfaces cannot move into contact with one another, so that the film strip 2 can readily be reinserted at any time into the film channel which is being held open by the unit 8, 8a and 8b. The pocket surfaces may be provided with transverse folds 1b which have already been described earlier.

Figure 17:
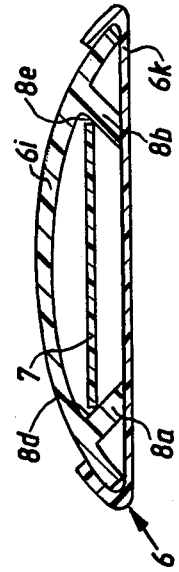
FIG. 17 is a view through the cassette of FIG. 15 but showing the same in its operative position in which it is inserted in a camera.
Figure 15:
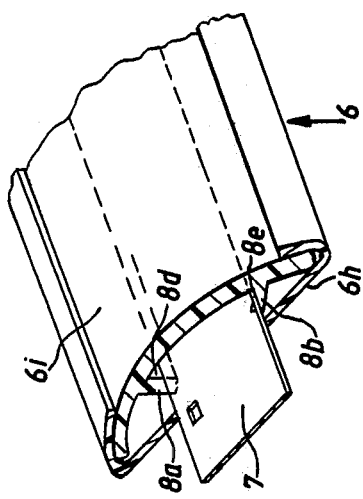
FIG. 15 is a view somewhat similar to FIG. 14, showing a further embodiment.
Figure 16:
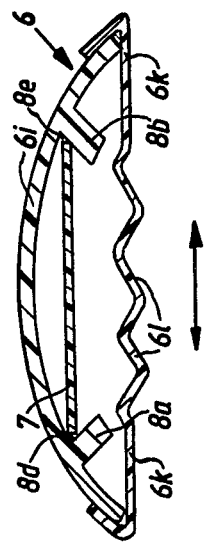
FIG. 16 is a section through the cassette of FIG. 16, in the inoperative position of the same.

Another embodiment of spacers according to the invention is illustrated in FIGS. 15-17. Here, the pocket 6 is composed of two elastic film parts 6i and 6k, the parts 6k overlapping the longitudinal edges of the part 6i. Both parts 6i and 6k are of somewhat elastic material. The spacers are formed as longitudinal ribs 8a and 8b on the part 6i directly. They are inclined towards one another and their distance at the point where they are formed of one piece with the part 6i is greater than the film strip, whereas at their free ends the distances are smaller than the film strips. They thus form triangular guide grooves 8d and 8e for the film strip 7. To increase the extensibility of the part 6k transverse to the elongation of the pocket there may be longitudinal corrugations 61 or longitudinal folds or longitudinal ribs provided at various local areas.

A section through the pocket of FIG. 16 is shown in FIG. 16 illustrating the pocket in the rest position, i.e., the one in which it is stored and is not used in the camera. Arcuate bends are strongly exaggerated for better illustration. The film strip 7 is guided in the grooves 8d and 8e and the pocket portion 6i is bent convexly in outward direction. The spacers 8a and 8b have a small distance from the pocket portion 6k which is in its contracted position. If the pocket of FIGS. 15-17 is inserted in curved condition into a camera, with the centers of curvature being located beneath the part 6k, then the transverse arcuate bending of the pocket portion 6i is reduced, leading to a transverse extension of the pocket portion 6k, as shown in FIG. 17. Because of this the spacers 8a and 8b engage the inner surface of the pocket portion 6k. To insert the film strip in this operating position of the pocket the free channel remains which is being formed by the spacers 8a, 8b and the grooves 8d and 8e, so that the film strip can be readily reinserted at any time.

The several embodiments of pockets as shown in FIGS. 1-16 and in FIGS. 11 and 12, may be provided with means for assuring the maintenance of a free film channel according to FIGS. 14 or 15-17. It will be appreciated that in addition to the exemplary embodiments of pockets and associated cameras shown herein, other possibilities exist and it goes without saying that these are intended to be incorporated within the protection sought in the appended claims. In particular there are various possibilities for manufacturing the pockets of one or several parts and different constructional possibilities for the folds 1b, 6l or the grooves 8c or for the construction of the blocking teeth 1h and the abutments 1i.

To all intents and purposes all known per se film transporting mechanisms and double exposure preventing devices as well as lens types, shutter types and exposure control devices known in the art, may be used with the cameras for the cassettes according to the invention. The pockets may also be provided with film sensitivity control marks which are capable of being mechanically or electrically scanned by appropriate equipment in cameras, such equipment being known per se. It would also be possible to install the pockets 1, 6 in several curves in a camera, with the radius of curvature of each curve of course having to be so selected that it is not too small to permit proper movement of the film strip. Particularly the portion 6g of the pocket 6 which contains the non-exposed film strip could be inserted in several curves in order to decrease the overall size of the camera, since the film strip 7 need only be pulled out of this portion and subsequently does not have to be pushed back into it. The pockets 1, 6 may of course be provided at their outer surfaces with various fields or locations for recording of different types of information.

Coming now to FIGS. 18–22 it will be seen that the film cassettes shown therein are formed by elongated pockets 201 which are thin with respect to their length and width and which have at their narrow side an opening, preferably a slot 201 through which the film strip 202 in them extends outwardly. The film strip is somewhat longer than the pocket 201 and is preferably provided with one perforation 202a per film frame, the perforations being arranged along one of the longitudinal edges of the film strip. The film strip contained in the interior of the pocket 201 is protected against the unintentional admission of light by lining the slot 201a with a light sealing strip 201b, for example a strip of felt or plush. The film end which projects from the pocket 201 may be provided with a raster to prevent it from conducting light into the interior of the pocket and may also be protected against undesired pulling out of the pocket e.g., by an adhesive strip 203. To make the pockets 201 more flexible in the areas where they may have to be curved on insertion into a camera, each pocket is provided at the appropriate portions of its flat side with transverse grooves 201b between which wedge-shaped ribs remain.

Figure 18:
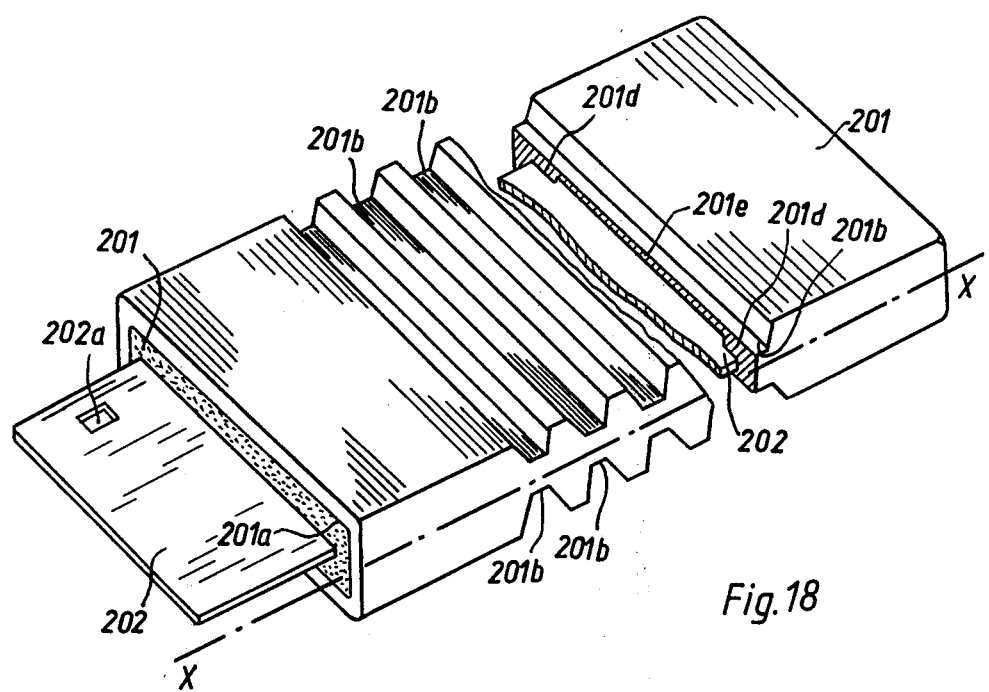
FIG. 18 is a perspective view of yet a further embodiment of a cassette according to the invention.

The pocket 201 according to FIG. 18 is of one piece, being made of elastically yieldable synthetic plastic material which does not permit the passage of light therethrough. Its interior is provided with a hollow for accommodating the film strip 202 which hollow is formed by two guide grooves 201d located symmetrically to the center line of the pocket 201 and serving to guide the two lateral edges of the film strip 202 and a slot 201e connecting the two guide grooves 201d and having a greater width so that there is no danger that the picture area of the film strip might become scratched.

The hollow for the film strip, i.e., the hollow formed by the guide grooves 201d and the slot 201e, must remain even when the pocket 201 is installed in curved position in a camera and when the film has been pulled out of it, so as to permit the re-insertion of the film strip 202 into the pocket. To assure this the pocket 201 respectively its transverse grooves 201d are so constructed that the region of the hollow 201d, 201e in which the film strip 202 is located and into which it subsequently must be pushed again, forms in effect the neutral bending line X of the pocket 201 for bends transverse to the direction of elongation. In other words, the pocket 201 must be so constructed that when being bent all its transverse ribs between transverse grooves 201b on one flat side of the pocket are pushed together and on the other side they are pulled apart, without the bent pocket surfaces being capable of moving towards one another or touching one another in the interior of the pocket. The region about the central plane of the hollow 201d, 201e does not undergo any change in length despite the bending of the pocket. This is obtained not only by the trapezoidal or wedge-shaped configuration of the grooves 201b respectively the transverse ribs between them, but in FIG. 18 also by an arrangement of the transverse grooves 201b respectively ribs on both flat sides of the pocket 201 which is preferably symmetrical with reference to the center plane of the hollow space 201d, 201e.

Figure 19:
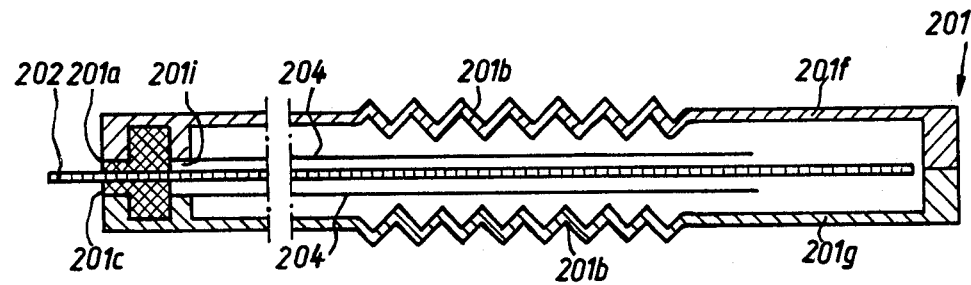
FIG. 19 is a longitudinal section through another embodiment of a cassette according to the invention.
Figure 20:
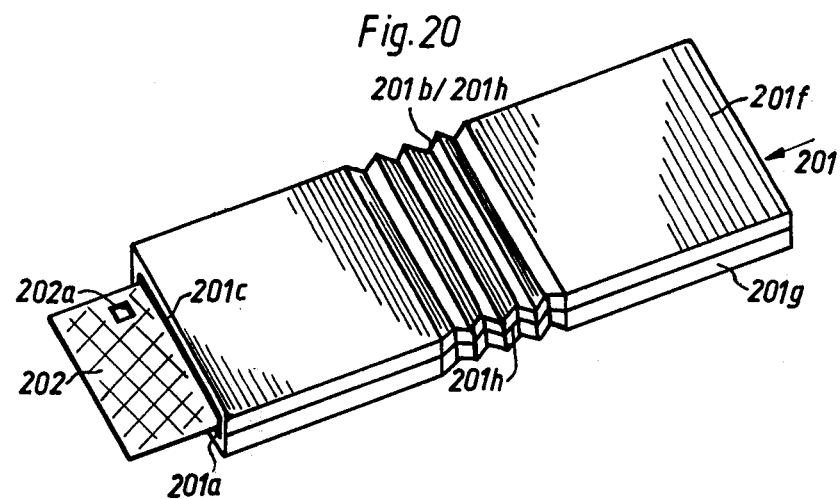
FIG. 20 is a perspective view of the cassette in FIG. 19.
Figure 21:
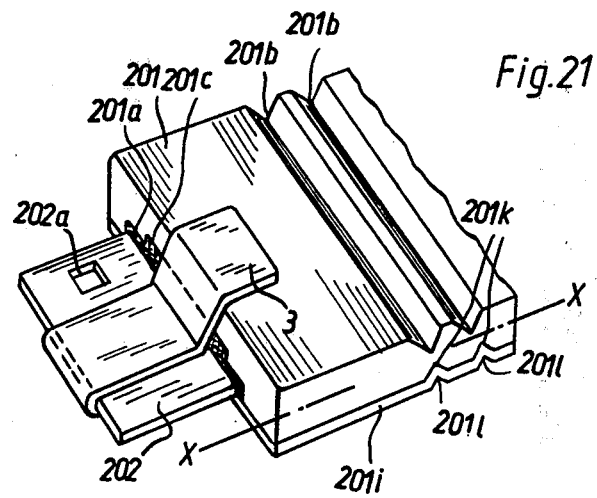
FIG. 21 is a perspective view showing a part of a cassette according to a further embodiment.

A further embodiment of a pocket 201 is illustrated in FIGS. 19 and 20. This pocket is also of synthetic plastic material which does not permit the penetration of light and is plastically yieldable. In this embodiment, however, the pocket is of two mirror-symmetrical sections 201f, 201g which may be connected with one another in suitable manner, for example by heat welding or the like. However, this pocket could also be made of one piece because due to the elasticity of the synthetic plastic material it could nevertheless be removed from the mold despite its particular configuration. This pocket 201f, 201g is also constructed in such a manner that in its interior it has a hollow space for the film strip 202 the region of which about the center plane is constructed as the neutral line for bends transversely to the longitudinal direction, and in which the film strip 202 is guided. For this purpose, the transverse grooves 201b on both flat sides of the pocket are symmetrical with reference to the neutral line but produced not by thinning the material but instead by bellows-like folding. If during bending of the pocket 201 on insertion into a camera, a small bulging occurs about the longitudinal center line of the flat side, it is additionally advantageous to extend the bellows-like folds also to the longitudinal narrow sides of the pocket in form of folds 201h. The film opening within the slot 201a is provided with an enlargement and subsequently thereto with a further slot 201i. In the enlargement and in the outer slot 201a the light sealing strip 201c is arranged and mounted. The lips of the inner slit 201i are provided at both sides of the center plane of the hollow with glides 204, for example of paper or metal foil, the other ends of which extend beyond the region of the fold 201b, 201h into the interior of the pocket 201f, 201g where they are freely located. Their widths extends at least over a part of the width of the film strip 202. When the pocket 201f, 201g is bent in direction transverse to its elongation, the folds 201b of the one flat side become pushed together whereas the folds of the other flat side become extended or pulled apart. The end of the glide 204 on that side of the center plane at which a pulling-apart of the folds 201b takes place, moves to a larger distance from the pocket end than that which it assumes in the straight (uncurved) position of the pocket, whereas the end of the other glide 204 located at the side where the folds 201 are being pushed together, moves from its original starting position slightly and towards the pocket end. The film guide track remains free and unchanged between the glides 204 even when the film strip 202 has been partly removed from the pocket 201 so that it can be subsequently readily re-inserted. The particular purpose of the glides 204 is to assure that when the film strip 202 is returned into the pocket 201 by the transporting equipment of the camera, it will not abut with its end located in the pocket 201 against the inner side of the folds 201e and thus be prevented from reinsertion. If this measure were not provided, then the film strip could be blocked against re-insertion or else be bent and damaged.

A further embodiment of the invention is illustrated in FIG. 20 in which the pocket is formed by a synthetic plastic part 201 in which the guide track for the film strip 202 as well as the transverse grooves or folds 201b are at one flat side and are integrally formed. The pocket is completed by adhesively connecting or heat welding the other flat side 201i to the first flat side. Since the flat side 201i is substantially thinner, the plane forming the neutral line in which the film strip is located, is still in the pocket part 201; it is there shown in chain lines. In order to provide this position for the neutral line X, transverse grooves or folds 201k must be provided which is approximately symmetrical to the grooves or folds 201b at the edges of the pocket part 201 onto which the flat side 201i is adhesively bounded or welded. Correspondingly, the flat side 201 must also be provided with corrugations or folds 11 corresponding to the folds 201k and meshing with them.

Figure 22:
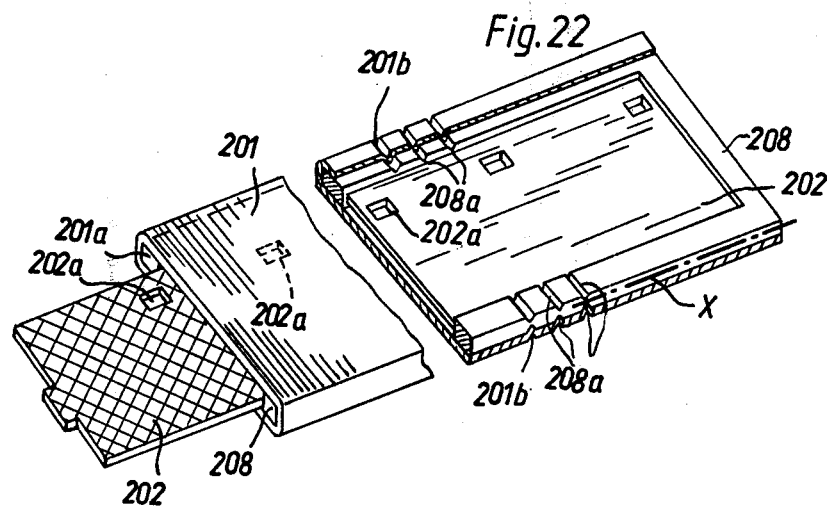
FIG. 22 is a perspective view of an additional embodiment of the cassette according to the invention.

In accordance with the embodiment of FIG. 22 the pocket 201 is provided with a spacer 208 which maintains the film channel in open condition for reinsertion of the film. The spacer 208 is of elastic material and the neutral line X, which is again shown in chain lines, is located approximately in the region of its center plane. At the location at which the pocket 201 must be bent on insertion into a camera, the surfaces of the spacer 208 which face the flat sides of the pocket are provided with transverse grooves 208a which are preferably symmetrical with reference to its center plane. The pocket 201 itself is provided with transverse folds 201b which engage in these transverse grooves 208a of the spacer 208.

It is clear that other embodiments besides those shown in FIGS. 18–22 are possible. The grooves or folds 201b could also be arranged non-symmetrical with reference to the neutral line X, to the extent that they have the same depth and shape or profile but are offset relative to one another. It would also be possible for the profiled form of the folds or grooves in the one side to be triangular and in the other flat side to be trapezoidal. For example, if folds or grooves 201b are provided only in one flat side of the pocket, then it will suffice if a glide member 204 is provided only at the lip of the slot 201a, 201i which is adjacent this particular flat side. The construction of the opening for removal and reinsertion of the film strip 202 in form of two sequentially arranged slots 201a,201i could also be changed. If only a single slot 201a is provided, a respective glide strip 204 could be mounted between a lip of the slide 201a and the light sealing strip 201c associated with the slip, with one of the glide strips having its end which is located within the pocket connected to the pocket, for example to the pocket end.

All of the embodiments of FIGS. 18–22 have in common that the interior of the cassette has a hollow accommodating the film strip 202 and provided with a region which on bending of the cassette 201 transversely to its elongation forms approximately a neutral line X, i.e., which represents an always open channel for the withdrawal and the insertion of the film strip 202. The transverse grooves or transverse folds form an additional reinforcement for the flat sides of the pockets so that the same do not—on bending transversely to the longitudinal extension of the pocket—become transversely bent parallel to the longitudinal direction.

FIGS. 23–26 show a further film cassette for a film strip 101, which is formed by a light-opaque flat pocket having at least the length of the film strip 101 and being provided with an opening 102 extending normal to the elongation of the pocket for the passage of the film strip 101. In its interior the pocket has a spacer 103 to form a free film channel for the film strip 101. The spacer 103 is shown in FIGS. 23–25 and formed by a U-shaped frame the free inner length of which is at least equal to the length of that portion of the film strip 101 which is located in the pocket and the free width of which corresponds to at least the width of the film strip 101. The thickness of the frame 103 is slightly greater than the thickness of the film. The surfaces of the U-shaped frame 103 which extend parallel to the film plane are smooth. At the open narrow side of the U-shaped frame 103, which is to be arranged at the slotted side of the pocket, two light sealing strips may be provided in a non-illustrated manner, leaving a slot between its two legs.

The pocket of FIGS. 23–25 is so constructed that the material 104 of the pocket for example light-opaque paper or a light-opaque synthetic plastic foil, are welded or adhesively bonded to the flat side of the frame 103. The material 104 is advantageously supplied in form of webs the width of which corresponds to the length of the frame 103. It is advantageous if the web can be subdivided into sections having a length corresponding to double the width of the frame plus the single frame thickness, for example by means of a rows of perforations 104a, so that on reaching the working station of a machine for making these pockets the respectively needed piece of web can be readily severed, for example by stamping or the like. Of course, severing can also be effected without the perforations 104a.

A web of the material 104 is supplied in the direction of the arrow 105 in its longitudinal direction as shown in FIG. 23. Thereupon, a U-shaped frame 103 is moved in direction normal thereto as indicated by the arrow 106 from above, with its lower leading edge and a lower longitudinal edge being placed flush to the longitudinal edge and the transverse edge of the material 104, with the frame being adhesively bonded or welded to the web 104. A portion of the pocket material is then severed along the perforation 104a. Finally, the film strip 101 is inserted into the frame 103 in direction normal to the direction of supply 105 of the web 104, either at a downward inclination from above or in a plane parallel to the web, as indicated by the arrow 107. The insertion is made in such a manner that the film end of the film strip extends out of the pocket after the pocket has been completed, through the light seal of the slot 102, so that it can be engaged by a film transportation mechanism of the camera later on. Finally, the surface of the frame 103 is provided with adhesive material and the still free end of the severed portion of the pocket material 104 is folded over one narrow longitudinal narrow side of the frame 103 and adhered to the surface of the same.

In lieu of bonding it is evident that heat welding can be used, which may be effected simultaneously from above and from below, if desired. Should the influence of the heat during the welding make it advantageous, the film strip 101 can be inserted into the pocket 103, 104, only after the pocket is completed, by moving through the slot 102 in the direction counter to the arrow 107. It would also be possible to first supply the web material 104 in the direction of the arrow 105 and then the film strip 101 in the direction of the arrow 107 and only subsequently to place the frame 103 without light sealing strips in the direction of the arrow 106 from above about the film strip 101, to thereafter weld the material piece 104 or to bond it and then to apply the light seal.

This just mentioned method may be advantageous if the frame 103 is not only of U-shaped construction but also has the one flat side 108 as shown in FIG. 26. In this case, the complete 102 and guide channel of the film strip 101 must be formed as a profiled groove in the frame part 103, 108. The material web 104 must accordingly be severed into parts the width of which corresponds to the length of the frame part 103, 108 and the length of which corresponds to the frame part 103, 108. In this embodiment of a method for making a pocket-like film cassette according to the invention, the film strip 101 may also be inserted only after the pocket 104, 103 and 108 is completed and the insertion can be effected through the slot 102.

Figure 27:
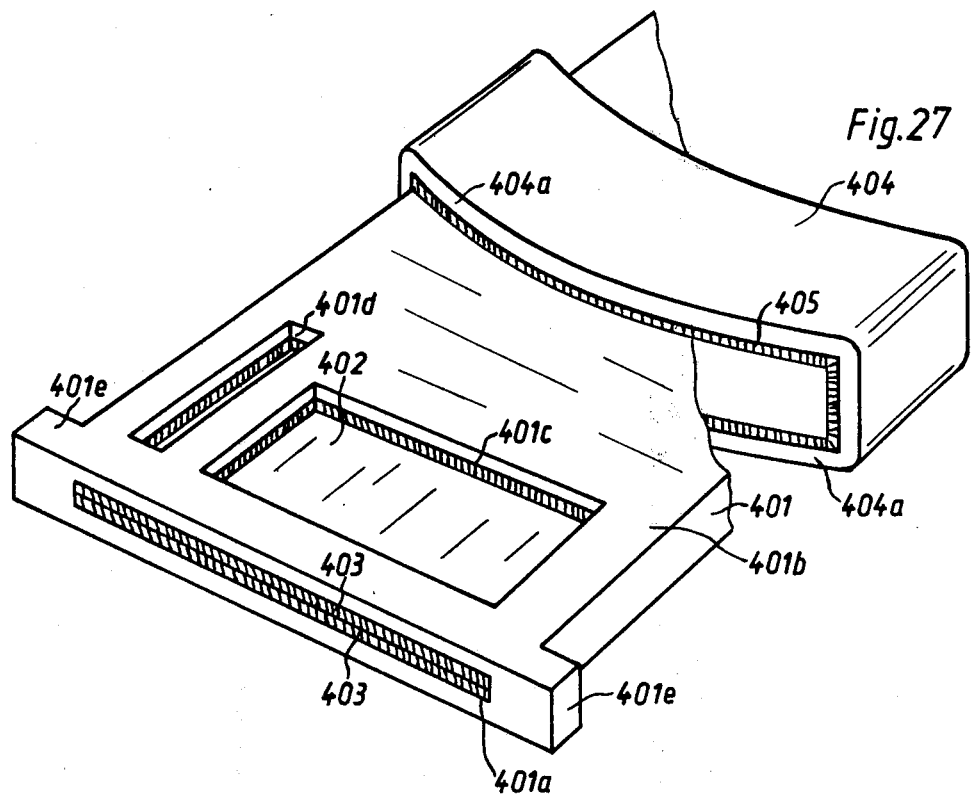
FIG. 27 is a fragmentary view, partly broken away, showing another embodiment of a film cassette according to the invention.

A pocket-like film cassette 401 is shown in broken-away maner in FIG. 27, but not in actual size. Located within the pocket 401 is a film strip 402 having a length which is so chosen that several exposures can be made on it one after the other in its longitudinal direction. The pocket 401 is essentially rigid and is provided at one of its longitudinal sides with a slot 401 through which the film strip 402 can extend. The slot 401a is provided with a light seal, preferably with plush strips 403, between which the film strip 402 extends but which prevent the entry of light into the interior of the pocket 401. One flat side 401b of the pocket is provided adjacent the beginning of the pocket 401, i.e., near to the slot 401a, with an exposure window 401c behind which the emulsion side of the film strip 402 is located. The exposure window 401c has approximately the size of one film frame, i.e., it may be slightly smaller or larger than the film window in the camera. If it is smaller, then the film format is determined by the film window 401c of the pocket; if it is larger, then the film format is determined by the size of the film window in the camera. The film exposure window 401c may be so large that the not illustrated film transporting perforation is accessible through the film window so that, for example, a gripper may extend through the film exposure window 401c from the side of the lens and more the film strip by respective distances each corresponding to a film frame. However, it is also possible to provide a film transporting slot 401d extending parallel to the window 401c in the flat side 401b and, if desired, also in the other flat side, through which the film transporting mechanism of the camera can cooperate with the film perforations of the film strip in the pocket. A separate film transporting slot 401d has the advantage that the window 401c of the pocket itself can determine the picture format of the exposures made on the film strip 402 and thus sharply delimits the exposures made.

Providing the exposure window 401c in a flat side 401b of the pocket has the advantage that each exposure in a camera takes place through this window 401c. This means that when the film strip 402 is installed in the pocket its first film frame is located in the exposure window and its beginning need be located only a few millimeters ahead of the exposure window 401c in the slot 401a, respectively between the light sealing strips 403 thereof, but without extending out of the slot 401a. The film strip beginning is thus located light-tightly in the slot 401a. When it is transported out of the slot 401a in a camera, it can be readily pulled out of the pocket 401. The same is true with respect to the trailing end of the film strip which need be located only a few millimeters behind the last film frame but can be exposed in the window 401c. When, after the film strip 402 is completely exposed, it is moved back into the pocket 401 by the film transport mechanism of the camera, such transportation is in no way disadvantageously influenced due to the fact that the film strip end remains in the pocket 401. Because the length of the film strip 402, due to its stepwise exposure through the window 401c, need be hardly greater than the length required to obtain the desired number of exposures, the length of the pocket itself may also be smaller than in the other preceding embodiments. In other words, due to the very short length of the film which must be located ahead of the first film frame and located behind the last film frame, the film strip 402 can be short and its overall length is hardly greater than the overall length of the film frames provided for exposure on the film strip, so that a saving in terms of unexposed film needed to load the pocket is obtained. At the same time, of course, the pocket itself is also correspondingly shorter and this results not only in a saving of material but also in a still smaller and therefore handier cassette.

To obtain all the desired advantages despite the window 401c and possibly the film transporting slot 401d, a closure must be provided for the film window 401c and the slot 401d if the same is present, and this closure must be such that when a pocket 401 is used in an associated camera, the closure can be opened without any additional manipulation and can be closed again before the pocket 401 is removed from the camera.

Figure 30:
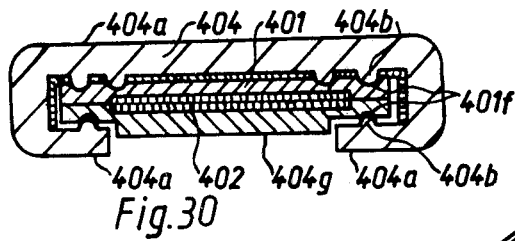
FIG. 30 is a section taken on line XXX—XXX of FIG. 29.
Figure 29:
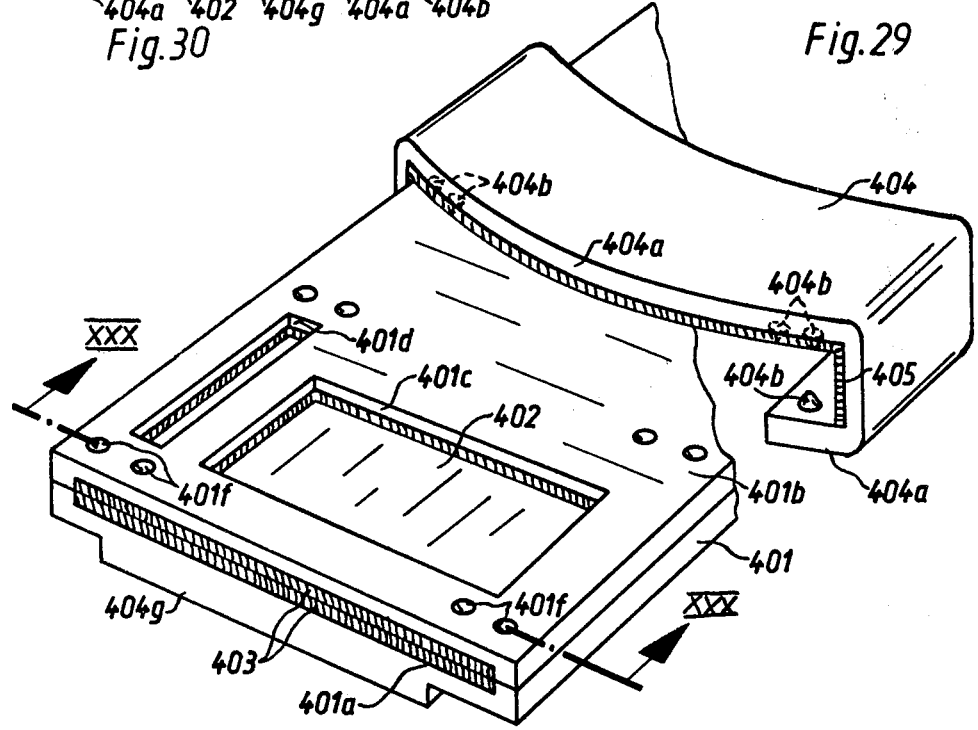
FIG. 29 is a view similar to FIG. 27 but illustrating a further embodiment of the cassette according to the invention.

Such a closure is provided, according to FIGS. 27 and 29-30, by a slide 404 which is placed exteriorly over the pocket 401. The slide 404 in accordance with FIG. 27 is a rectangular frame with an inner rectangular recess corresponding to the exterior cross-section of the pocket 401. The slide 404 may, for purposes of light sealing, be provided at its interior with a strip of plush 405. It can additionally or in lieu of the same be of elastic material and elastically engage the pocket so that there is a friction connection between the slide 404 and the pocket 401. Both flat sides of the slide 404 are provided with a concave curvature with reference to the film window of the camera. However, it will also be possible to make the two flat sides of the slides 404 convex with reference to the pocket 401 and thus obtain the same result. The slide 404 is somewhat longer than the window 401c and/or the transport slot 401b, so that in the closed position of the slide 404 both openings 401c and 401d are closed against the entry of light.

FIG. 27 shows that at the beginning of the pocket 401 there are provided two projections 401i extending in the direction of its width and serving as abutments for the slide 404 when the same is in the position closing the opening 401c and 401d. This prevents the slide 404 from accidentally being pulled off the pocket 401. The corresponding abutments can also be provided at the position of the slide 404 which is assumed when the openings of the pocket are exposed, so as to prevent inadvertent pulling off of the slide from the trailing end of the pocket. However, the latter measure is not so important because the trailing end of the pocket is substantially farther removed and also an unused not yet exposed cassette usually has some mark to indicate this fact, which is torn or broken prior to or during insertion into the camera.

FIGS. 27-34 show that the slide 404 is so dimensioned that it extends transversely to the elongation of the pocket at least at one point 404a of each of its ends beyond the corresponding dimensions of the pocket 401, e.g. that it is thicker than the pocket 401. At these projections projecting portions, which thus form abutment 404a, the slide 404 may be engaged by members of the camera in a manner to be described subsequently, and be taken along into the positions in which it either opens or closes the openings 401c and 401d.

FIGS. 29 and 30 show an embodiment which is somewhat different from the one in FIG. 27, and in which the abutments 401e are omitted. In their place there are provided, between the pocket 401 and the slide 404, springbiased abutments 404b, 401f or snap-like projections and depressions which releasably arrest the slide 404 in its position in which it closes the openings 401c and 401d. In addition, in this embodiment the slide 404 is not configurated as a closed bracket, but instead as a clamp the side of which facing the pocket side having the window 401c, is open. The free ends of the clamp must of course overlap the flat side to such an extent that they also close a film transporting slot which may be provided in this flat side so as to prevent the entry of light therethrough. It is advantageous if the pocket 401 is provided between the free ends of the clamp 404 with a center projection 401g the edges of which serve as a guide for the clamp shaped slide 404.

Figure 28:
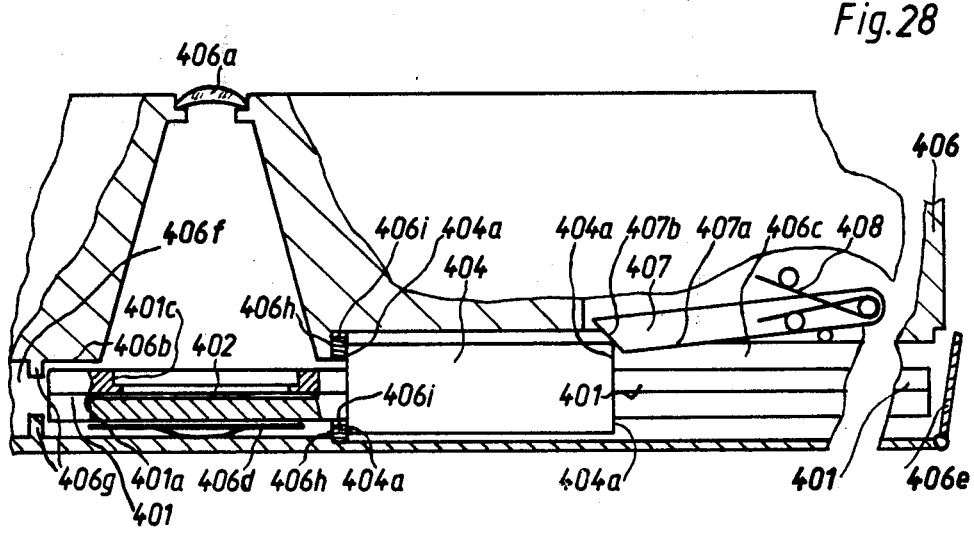
FIG. 28 is a partly sectioned, partly brokenaway view of a camera suitable for use with the cassette in FIG. 27, seen in direction normal to the film transportation direction and to the axis of the lens.

FIGS. 28 and 31 show those parts of a camera 406 which are necessary for an understanding of the invention this camera being intended for use in a cassette in accordance with the FIG. 27 or 29. Reference 406a identifies the lens of the camera, reference numeral 406b its film guiding roller, reference 406c the cassette space for a pocket 401, 404, and reference numeral 406 a cassette pressure plate. A cover for the cassette space 406c is identified by reference numeral 406e and a space for the film strip 402 which has been withdrawn from the pocket 401 is identified with reference numeral 406f. The film strip 402 may be transported into the space 406f either prior to or subsequently to the exposure. If it is transported into the space prior to exposure, then it is returned back into the pocket in a stepwise sequence, i.e., sequentially after each exposure. If it is withdrawn during each exposure from the pocket, then it is transported stepwise into the space 406f and must then be returned into the pocket subsequent to completion of the exposures in one continuous movement. Any known per se film transport mechanism can be used for this purpose.

FIG. 28 shows that the cassette space 406 is configurated as a duct into which the pocket 401, 404 is pushed from one narrower side of the camera in parallelism with the film transporting direction. Located behind the film supporting wall 406b, as considered in the direction of insertion of the pocket there is provided an abutment 406g for the leading end of the pocket so that the exposure window 401c assumes the proper position with reference to the film supporting wall 406b and thus the film window of the camera. The cassette space 406c is so narrow in the region of the wall 406b that the slide 404 cannot be pushed onto the wall 406b, only the pocket 401 itself. Accordingly, the duct 406c is so wide—ahead of the wall 406b—that the pocket 401 with its slide 404 can be inserted and it is narrowed immediately ahead of the wall 406b by abutments 406h. These are provided with light sealing strips 406i. If a cassette 401, 404 with its exposure window 401c closed by the slide 404 is inserted into the duct 406 parallel to the film transporting direction, then the abutments 404a of the closure 404 engage the abutments 406h so that during further insertion of the pocket until the leading end of the pocket engages the abutments 406g the slide 404 is retained against movement. Due to this, the film exposure window 401c (and the transport slot 401b, if present) is opened so that taking of pictures is now possible. The last film frame on the strip 402 will finally become located in the window 401c whether or not the exposure is effected during transportation of the film strip out of the pocket or during transportation back into the pocket. Since the pocket 401 is located straight in the camera without bends or curvatures, and has a substantial stiffness against deformation, the film strip can be readily returned into the pocket 401 without any difficulties.

To return the slide 404 into its closure position in which it closes the openings 401c and 401d subsequently to the exposure of the film strip and prior to removal of the pocket 401 from the camera, an abutment arm 407 extends into the duct 406c under the influence of a spring 408. This arm is so arranged that it extends into the path of movement of the slide 404, namely in the direction of pocket insertion with a longer inclined surface 407a and in the direction of pocket removal with a shorter inclined surface 407b. During the insertion of the pocket 401 the frictional force acting between the pocket 401 and the slide 404 can overcome the force exerted by the arm 407 and push it out of the way of the slide 404 by engagement with the long inclined surface 408. During the removal of the pocket 401, however, the force relationships are changed due to the short substantially inclined surface 407b. Thus, the surface 407b pushes the slide 404 back to its original position in which it covers the window 401c and the transport slot 401d. After the slide 404 has reached this position again, the force opposed to further movement of the pocket 404 due to the abutments acting upon the pocket suffice to displace the arm 407 out of the path of movement of the slide 404 during the removal of the pocket from the camera.

The cover 409 of the camera shown in FIGS. 31 and 32 is a cover for the reverse side of the camera and exposes the film supporting wall 406b of the camera 406. It is constructed as a slide 409 extending parallel to the film transport direction and movable in grooves 406k. It has a pivotable part 409a. Two abutments 409b are provided on the pivotable cover part 409a, spaced from one another by a distance corresponding to the length of the slide 404. The wall 406b is provided with a depression having double the length of the slide 404. To open the camera 406 of FIGS. 31 and 32 the cover 409 is moved along the grooves 406k in the direction of the arrow 410, until the free end of the pivotable cover part 409a is disengaged as shown in FIG. 31. In this position the pivotable cover part 409a is pivoted to its open position shown in chain lines and thereafter the cassette end of the pocket 401a is inserted into the duct 406c. On closing the pivotable cover part 409a the abutments 409b of the same engage at opposite sides outside the abutments 404a. When thereafter the cover 409a is shifted in the grooves 406k counter to the direction of the arrow 410, in order to lock the camera, and assume the position shown in FIG. 32, the abutments 409b take along the abutments 404a and thus move the slide 404 to a position in which—in the camera-locking position of the cover 409 as shown in FIG. 32—the exposure window of the pocket 401 is opened. Conversely the abutments 409b take along the slide 404 when the cover is moved in the direction of the arrow 410, so as to close the exposure window of the pocket 401. Opening and closing of the pocket exposure window 401c, or slot 401d is thus coupled with them and becomes an automatic function of the opening and closing (respectively locking and unlocking) of the camera cover.

It will be appreciated that a slidable and pivotable cover 409 can be replaced with a cover which is only slidable, in which case the abutments on the cover would then have to be constructed so as to be able to move the arm 407 of FIG. 28.

Figure 33:
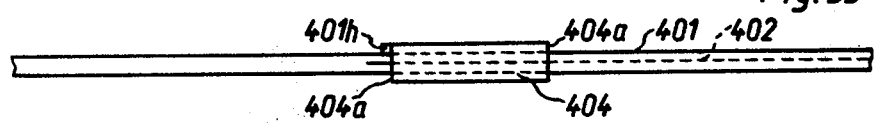
FIG. 33 is a side view of a further cassette according to the present invention.
Figure 34:
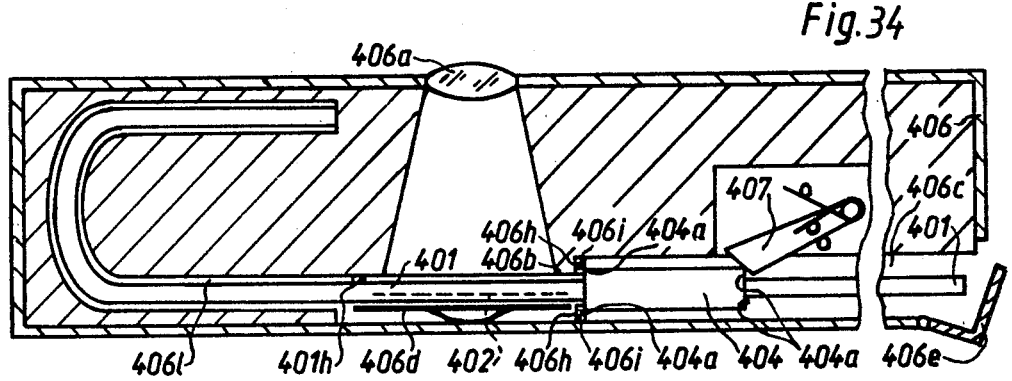
FIG. 34 is a view, partly in section, of a camera suitable for using the cassette of FIG. 33.

The further embodiments for the cassette and the camera shown in FIGS. 33 and 34 differ from those in in FIGS. 27 and 28 only in that a pocket 401 is used which corresponds to the FIGS. 11 and 12 and has an exposure window 401c located approximately in the middle of the pocket. Correspondingly, the non-exposed film strip is located in one half of the pocket and is transported after exposure through the window 401c into the other half of the pocket. The pocket 401 must be provided with an abutment 401h for the cover 404 which prevents displacement of the same counter to its opening direction. The camera 406 of FIG. 34 for a pocket according to FIG. 3 differs from the camera of FIG. 28 only in that the storage space 406f is replaced with a cassette space 406l for the pocket portion which accommodates the exposed part of the film strip. The abutments of FIGS. 33 and 34 also have the advantage that the film strip and the pocket can be shorter than in some of the preceding embodiments—but still have the same number of film frames as those embodiments—because the film leader and the trailing film part located in the exposure window of the pocket, can be omitted.

Figure 36:
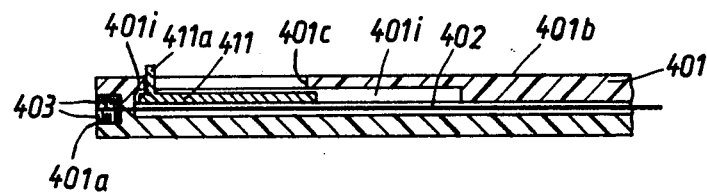
FIG. 36 is a section taken on line XXXVI—XXXVI of FIG. 35.
Figure 35:
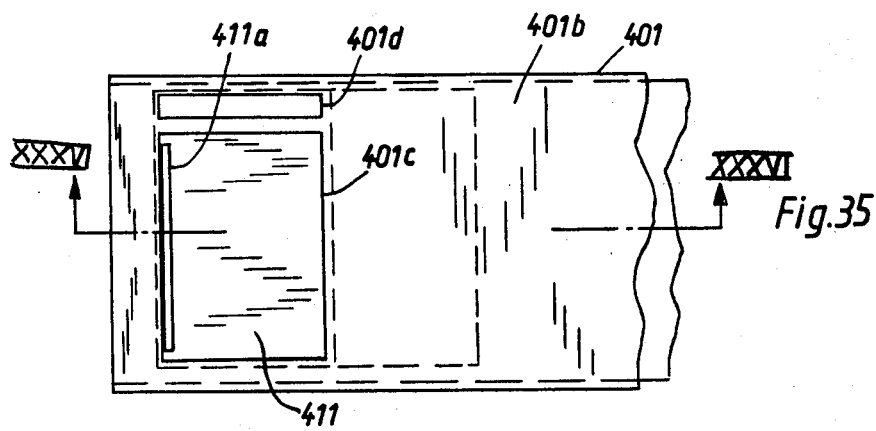
FIG. 35 is a fragmentary plan view of yet another cassette according to the invention.
Figure 37:
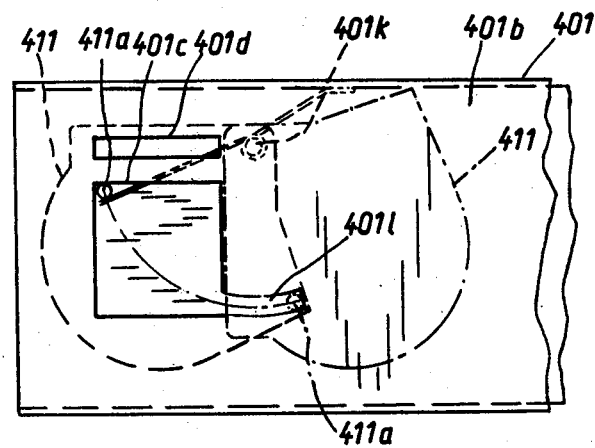
FIG. 37 is a plan view of a portion of still an additional embodiment of a cassette according to the invention.

Additional embodiments of the pocket are illustrated in FIGS. 35-37. These differ from those in FIGS. 27, 29 and 33 only in that the closure for the exposure window 401c of the pocket and/or the film transporting slot 401d if the same is provided, is configurated as a part 401 which moves between the pocket surface 401d and the film strip 402. In the embodiments of FIGS. 35 and 36, the closure member 401 is a slide which is guided for movement in film transporting direction in a groove 401a in the interior of the pocket, an abutment 401a of the member 401 extending through the exposure window 401c beyond the pocket surface and being movable—for example by the abutment 406h, 407 of the camera of FIG. 28—into positions in which it respectively opens or closes the film exposure window 401c.

FIG. 37 shows that the closure member 401 may be formed by a member 411 which is turnable between the film strip and the pocket surface 401b about an axis 401k. If the exposure window 401 is of approximately quadratic outline, the window 411 may be circular or essentially circular. However, it may be advantageous if it is provided with lobes which depart from the circular shape, as shown in FIG. 37. In this embodiment, also, the abutment 411a extends through the window 401c beyond the pocket surface. To permit the member 401 to be moved into the chain line position in which it completely exposed the window 401c, the window 401c is formed with a slotted cutout 401l which extends from it in direction of the opening movement of the member 401a and which is concentric to the axis 401a; the abutment 401a moves into this cutout in the open position of the member 411. Member 411 of course has such shape that in the open and closed position of the member 411 the slot 411l is always closed against the entry of light.

It goes without saying that still further embodiments are possible, although not illustrated. For example in place of the member 401 the pocket could also be provided with a dual-member closure or any other type of known closure, so long as it can be moved to its open and closed positions by members of the camera organization. If a camera is provided which omits the abutments 406h for opening the closure of the pocket, then it is necessary to assure that light seals 406i are provided in such a manner that the opened window 401c is protected against access of light even when the camera cover 406e is in open condition.

While the invention has been illustrated and described in a film-strip camera system, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. A film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film strip therethrough; means for sealing the opening against the entry of light into the pocket; said pocket having two major walls in part bounding said compartment; spacing means in said compartment for preventing said major walls from moving into contact with one another and thus blocking said compartment; said spacing means comprising spacing elements located in said compartment laterally of the path of film strip movement therethrough; and wherein said spacing elements are lateral guides for longitudinally extending edge portions of the film strip.

2. A film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film strip therethrough; means for sealing the opening against the entry of light into the pocket; said pocket having two major walls in part bounding said compartment; spacing means in said compartment for preventing said major walls from moving into contact with one another and thus blocking said compartment; said spacing means comprising an insert which is installed in said compartment.

3. A film cassette as defined in claim 2, wherein said pocket is flexible.

4. A film cassette as defined in claim 2, wherein said pocket has grooves or folds extending across it in direction normal to the pocket elongation.

5. A film cassette as defined in claim 2, said spacing means further comprising spacing elements located in said compartment laterally of the path of film strip movement therethrough.

6. A film cassette as defined in claim 2, said compartment constituting at least substantially in the region for accommodating the film strip the neutral line for flexing of the pocket in direction transverse to the elongation thereof.

7. A film cassette as defined in claim 2, and further comprising a bending-resistant member embracing said pocket at least in part and preventing spreading-apart of said opening for the film strip.

8. A film cassette as defined in claim 2, wherein a portion of the film strip extends out of said pocket through said opening, said portion being opaque to light.

9. A film cassette as defined in claim 8, wherein said portion is provided with a film perforation hole.

10. A film cassette as defined in claim 2, said film strip having a portion extending from said pocket out through said opening; and further comprising at least one perforation hole in said portion for engagement by the film transporting mechanism of a camera.

11. A film cassette as defined in claim 10, wherein said perforation hole is located on a line constituting an extension of a row of film transporting perforations in the film strip.

12. A film cassette as defined in claim 2, wherein the film strip has a leading end extending out through said opening, and a trailing end; and further comprising cooperating retaining portions on said trailing end and on said pocket adjacent said opening for preventing withdrawal of said trailing end from said opening.

13. A film cassette as defined in claim 12, said retaining portions including a bead on said trailing end of a width which is greater than the width of said opening.

14. A film cassette as defined in claim 10, said camera having spaced ends; and further comprising means at one of said ends for arresting the pocket in a camera against movement relative to the camera.

15. A film cassette as defined in claim 14, said arresting means comprising a recess adapted to cooperate with a projection of a camera.

16. A film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film strip therethrough; and means for sealing the opening against the entry of light into the pocket; said pocket having two major walls in part bounding said compartment; spacing means in said compartment for preventing said major walls from moving into contact with one another and thus blocking said compartment; said spacing means comprising spacing elements located at opposite sides of the path of film strip movement, and a web connecting said spacing elements and extending parallel to the general plane of said pocket.

17. A film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film strip therethrough; and means for sealing the opening against the entry of light into the pocket; said pocket having two major walls in part bounding said compartment; spacing means in said compartment for preventing said major walls from moving into contact with one another and thus blocking said compartment; said spacing means comprising spacing elements arranged along the elongation of said pocket and provided with grooves to enhance the ability of said spacing elements to bend when the pocket is inserted in non-straight condition into a camera.

18. A film cassette as defined in claim 17, wherein said grooves are of trapezoidal or of triangular cross-section.

19. A film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film strip therethrough; and means for sealing the opening against the entry of light into the pocket; said pocket having two major walls in part bounding said compartment; spacing means in said compartment for preventing said major walls from moving into contact with one another and thus blocking said compartment; said pocket having major walls provided with inner surfaces bounding said compartment; and wherein said spacing means comprises spacing elements provided on at least one of said inner surfaces.

20. A film cassette as defined in claim 19, wherein said spacing elements are of one piece with the wall having said one inner surface.

21. A film cassette for a multi-exposure film strip, comprising a light-impermeable elongated flat pocket having a length corresponding at least to the length of a film strip to be accommodated therewithin and being provided with at least one opening extending transverse to the elongation of the pocket for passage of the film strip therethrough; and means for sealing the opening against the entry of light into the pocket; said pocket having two major walls in part bounding said compartment; spacing means in said compartment for preventing said major walls from moving into contact with one another and thus blocking said compartment; said spacing means comprising spacing elements located at opposite sides of the path of film strip movement, said spacing elements being inclined towards one another transversely of the elongation of said pocket and the major distance between them being larger than the film strip width whereas the minor distance between them is smaller than the film strip width, so that said elements each define a film strip guiding groove of substantially triangular cross-section extending lengthwise of the pocket.

22. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; said compartment constituting at least substantially in the region for accommodating the film strip the neutral line for flexing of the pocket in direction transverse to the elongation thereof; and a glide strip having a width equal to at least a part of the film strip width and having one end connected to said pocket at said opening and another end located in said compartment spaced lengthwise from said one end.

23. A film cassette as defined in claim 22, said pocket having two major sides provided with transversely extending grooves or folds, and said opening being bounded by two edges to one of which said glide strip is secured to overlie the grooves or folds in one of said major sides; and further comprising another glide strip similar to the first-mentioned one and secured to the other of said two edges to overlie the grooves or folds in the other of said major sides.

24. A film cassette for multi-exposure film strips, comprising a flat elongated pocket or opaque material having an inner compartment for a film strip and being of a length at least equal to the length of the film strip; at least one opening provided in said pocket and extending normal to the elongation thereof for passage of the film strip therethrough; said compartment constituting at least substantially in the region for accommodating the film strip the neutral line for flexing of the pocket in direction transverse to the elongation thereof; and wherein said pocket has two flat major walls which are provided with bellows folds at opposite sides of said neutral line.

25. A film cassette as defined in claim 24, said pocket also having two longitudinally extending minor walls, and said folds being provided in said minor walls also.

26. A film cassette as defined in claim 24, said opening having two longitudinal edges; and further comprising glide strips secured to the respective edges and having a width at least equal to part of the length of said edges, said glide strips overlying said folds and extending lengthwise of said pocket at opposite sides of said neutral line and having free ends located but unsecured in said compartment.

27. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough said pocket having two major walls which are adapted for slight convex bulging in direction outwardly of said compartment.

28. A film cassette as defined in claim 24, wherein one of said major walls bulges transversely to the elongation of the pocket to a greater extent than the other wall, and wherein said other wall has limited extensibility transverse to said elongation.

29. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; said opening being bounded by lips which sealingly engage a portion of the film strip to prevent the entry of light into said compartment; and means for maintaining said lips in such sealing engagement.

30. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; and further comprising sealing strips at said opening for engagement with the film strip so as to prevent the entry of light into said compartment.

31. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; a portion of the film strip extending out of said pocket through said opening; and further comprising a cap surrounding a section of said pocket which is provided with said opening so as to prevent the entry of light into said opening, said cap being connected to said portion of the film strip.

32. A film cassette as defined in claim 31, said cap having two major sides and two minor sides and being constructed so as to be squeezable at said two minor sides in direction normal to the planes of said major sides.

33. A film cassette as defined in claim 32, wherein said minor sides are provided with folds.

34. A film cassette as defined in claim 31, wherein said cap includes sealing means for preventing the access of light to said opening.

35. A film cassette as defined in claim 34, wherein said sealing means comprises a labyrinth seal which overlaps the edges of said opening in the pocket.

36. A film cassette as defined in claim 34, said sealing means including a sealing strip provided at an inner edge of said cap and bevelled in direction towards said pocket.

37. A film cassette as defined in claim 31; and further comprising means for preventing unintentional withdrawal of said cap and/or film strip from said pocket.

38. A film cassette as defined in claim 37, said preventing means comprising a friction fit between said cap and said pocket.

39. A film cassette as defined in claim 37, said preventing means comprising an adhesive strip adhered to said pocket and to one of said cap and film strip, respectively.

40. A film cassette as defined in claim 39, said adhesive strip having a weakened zone designed to tear when subjected to stress.

41. A film cassette as defined in claim 37, said preventing means comprising at least one projection on one of said pocket and cap, and at least one cooperating recess on the other of said pocket and cap, said projection being disengageable from said recess by an element of a camera in which said pocket is used.

42. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; the film strip having a leading end extending out through said opening, a trailing end and retaining portions on said trailing end and on said pocket adjacent said opening for preventing withdrawal of said trailing end from said opening; said retaining portions comprising a hole in said trailing end of the film strip, and a tooth on said pocket having a steep flank facing counter to the direction of film strip movement out of said opening and a subsequent inclined surface.

43. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; said pocket having a length substantially equal to twice the length of said film strip, and said opening being in form of two slots spaced lengthwise of the pocket by a distance corresponding substantially to the width of a film frame and defining between themselves an exposure window, so that the film strip can be sequentially transported out of said pocket through one of said slots, exposed in the window intermediate the slots and transported back into the pocket through the other slot.

44. A film cassette as defined in claim 43, said film strip having a leading end provided with a leader and a trailing end provided with a trailer which are located in said exposure window prior and subsequent to the first and last exposure, respectively.

45. A film cassette as defined in claim 44; and further comprising transverse folds in said pocket adjacent said film window so as to facilitate folding of the pocket back upon itself.

46. A film cassette as defined in claim 44, said leader and said trailer being provided with respective perforations.

47. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; said camera hving spaced ends; and further comprising means at one of said ends for arresting the pocket in a camera against movement relative to the camera, said arresting means comprising an eyelet on said pocket.

48. A film cassette for multi-exposure film strips, comprising a flat elongated pocket of opaque material having an inner compartment for a film strip and being of a length at least equal to the length of the film strip; at least one opening provided in said pocket and extending normal to the elongation thereof for passage of the film strip therethrough; said camera having spaced ends; and further comprising means at one of said ends for arresting the pocket in a camera against movement relative to the camera, said arresting means comprising a bead adapted to be inserted into a retainer of a camera.

49. A photographic camera for use with a film-strip cassette in form of an elongated pocket having a transverse opening for extraction and return of the film strip, comprising means forming an elongated cassette chamber; means forming a storage chamber for film strip extracted from the cassette; film transporting means for extracting the film strip from the pocket and transporting it into the storage chamber, and for subsequently returning the film strip into the pocket; and wherein said cassette chamber is arcuately curved in its longitudinal direction.

50. A camera as defined in claim 49; further comprising a lens and a film window located on an optical axis; and wherein said cassette chamber and said storage chamber are located at opposite sides of said optical axis.

51. A camera as defined in claim 49, said cassette chamber being shaped to accommodate the pocket in a non-planar condition; and further comprising means for holding the pocket in said non-planar condition.

52. A camera as defined in claim 49, said cassette chamber being in part formed as a duct into which the pocket is partially lengthwise insertable.

53. A camera as defined in claim 52, the pocket having a closed end and another end provided with said opening, and wherein said duct is dimensioned to receive said closed end.

54. A camera as defined in claim 52; further comprising means in said duct for retaining the inserted pocket therein.

55. A camera as defined in claim 49; and further comprising means for arresting the pocket in said cassette chamber against movement relative thereto.

56. A camera as defined in claim 49, said film transporting means including means for engaging a leading end of the film strip which extends out of the pocket through said opening.

57. A camera as defined in claim 49, said film transporting means being engageable with a perforation formed in a leading film strip end which extends out of the pocket through said opening.

58. A camera as defined in claim 49; further comprising a film spool mounted for rotation in said storage chamber and with which a leading end of the film strip is connectable; and wherein said film transporting means are operative for rotating said spool.

59. A camera as defined in claim 49, said film transporting means comprising a sprocket wheel engageable with perforations of the film strip.

60. A camera as defined in claim 49, said film transporting means comprising a film engaging element, and a spring motor which is tensioned when said element transports the film strip in a first direction into said storage chamber and is successively released to dissipate its stored energy for incremental return of the film strip in a second direction into the pocket during each operation of a shutter of the camera.

61. A camera as defined in claim 60; further comprising abutments cooperating with said element and said spring motor for limiting the extent of film strip transport in the respective directions.

62. A camera as defined in claim 60; and further comprising a film frame counter operative to count film frames in response to movement of the film strip.

63. A photographic camera for use with a film-strip cassette in form of an elongated pocket having a transverse opening for extraction and return of the film strip comprising means forming an elongated cassette chamber; means forming a storage chamber for film strip extracted from the cassette; film transporting means for extracting the film strip from the pocket and transporting it into the storage chamber, and for subsequently returning the film strip into the pocket; said cassette chamber being in part formed as a duct into which the pocket is partially lengthwise insertable; means in said duct for retaining the inserted pocket therein; said retaining means comprising pocket-retaining springs in said duct.

64. A photographic camera for use with a film-strip cassette in form of an elongated pocket having a transverse opening for extraction and return of the film strip comprising means forming an elongated cassette chamber; means forming a storage chamber for film strip extracted from the cassette; film transporting means for extracting the film strip from the pocket and transporting it into the storage chamber, and for subsequently returning the film strip into the pocket; means for arresting the pocket in said cassette chamber against movement relative thereto, said arresting means comprising a hook on the camera for engagement in an eyelet of the pocket.

65. A photographic camera for use with a film-strip cassette in form of an elongated pocket having a transverse opening for extraction and return of the film strip comprising means forming an elongated cassette chamber; means forming a storage chamber for film strip extracted from the cassette; film transporting means for extracting the film strip from the pocket and transporting it into the storage chamber, and for subsequently returning the film strip into the pocket; means for arresting the pocket in said cassette chamber against movement relative thereto, said arresting means comprising a groove in the camera adapted to receive a bead on the pocket.

66. A photographic camera for use with a film-strip cassette in form of an elongated pocket having a transverse opening for extraction and return of the film strip comprising means forming an elongated cassette chamber; means forming a storage chamber for film strip extracted from the cassette; film transporting means for extracting the film strip from the pocket and transporting it into the storage chamber, and for subsequently returning the film strip into the pocket; means for arresting the pocket in said cassette chamber against movement relative thereto, said arresting means comprising a projection on the camera and adapted to engage in a recess of the pocket.

67. A photographic camera for use with a film-strip cassette in form of an elongated pocket having a transverse opening for extraction and return of the film strip comprising means forming an elongated cassette chamber; means forming a storage chamber for film strip extracted from the cassette; film transporting means for extracting the film strip from the pocket and transporting it into the storage chamber, and for subsequently returning the film strip into the pocket; said film transporting means including means for engaging a leading end of the film strip which extends out of the pocket through said opening; said engaging means comprising a hook engageable in a perforation of the leading end.

68. A photographic camera for use with a film-strip cassette in form of an elongated pocket having a transverse opening for extraction and return of the film strip, comprising means forming an elongated cassette chamber; means forming a storage chamber for film strip extracted from the cassette; and film transporting means for extracting the film strip from the pocket and transporting it into the storage chamber, and for subsequently returning the film strip into the pocket, said film transporting means comprising a film gripper.

69. A photographic camera for use with a film-strip cassette in form of an elongated pocket having a transverse opening for extraction and return of the film strip, comprising means forming an elongated cassette chamber; means forming a storage chamber for film strip extracted from the cassette; and film transporting means for extracting the film strip from the pocket and transporting it into the storage chamber, and for subsequently returning the film strip into the pocket, the pocket having an exposure window at which the film strip is incrementally located outside the pocket; and further comprising means for arresting the pocket in the camera so that the exposure window registers with a film window of the camera.

70. A camera as defined in claim 69, said arresting means comprising guide rails for the pocket and/or pins engageable in locating holes of the pocket.

71. A camera as defined in claim 69, wherein sections of the pocket become located at opposite sides of the film window, said cassette chamber and said storage chamber each accommodating one of said sections in form of at least one arcuate loop.

72. A camera as defined in claim 69, the film strip having a leader and a trailer and the film strip, the leader and the trailer all having film perforations; and wherein said film transporting means cooperate with said film perforations in the region of said exposure window.

73. A photographic camera for use with a film-strip cassette in form of an elongated pocket having a transverse opening for extraction and return of the film strip, comprising means forming an elongated cassette chamber; means forming a storage chamber for film strip extracted from the cassette; film transporting means for extracting the film strip from the pocket and transporting it into the storage chamber, and for subsequently returning the film strip into the pocket; and wherein the film strip has one perforation for each film frame; said film transporting means including a turnable sprocket wheel having teeth spaced from one another at such angular distances that turning of the wheel by an increment corresponding to the distance from one to the next tooth advances the film strip by one film frame.

74. A photographic camera for use with a film-strip cassette in form of an elongated pocket having a transverse opening for extraction and return of the film strip, comprising means forming an elongated cassette chamber; means forming a storage chamber for film strip extracted from the cassette; film transporting means for extracting the film strip from the pocket and transporting it into the storage chamber, and for subsequently returning the film strip into the pocket; and said exposure window being provided in a major surface of the pocket; and further comprising blocking means on said pocket and operative for respectively exposing and light-tightly closing said exposure window.

75. A camera as defined in claim 74, said pocket also having a longitudinal slot extending lengthwise of the pocket opposite a line of perforations in the film strip and through which the film transporting mechanism engages the perforations, said blocking means also respectively exposing and closing said slot.

76. A camera as defined in claim 74, wherein the pocket has an additional exposure window in another major surface opposite the first-mentioned surface, said exposure windows being at least substantially in register with one another and said blocking means exposing and closing both of said windows.

77. A camera as defined in claim 74, said exposure window being located near one end of said pocket at which said opening is provided.

78. A camera as defined in claim 74, said blocking means comprising a slide which light-sealingly embraces the pocket and which in the direction of elongation of the pocket has a length which is at least equal to the length of said exposure window in said direction.

79. A camera as defined in claim 78, wherein said slide is a circumferentially complete bracket surrounding the pocket.

80. A camera as defined in claim 78, wherein said slide is substantially C-shaped and overlies said major surface, lateral minor surfaces and parts of another major surface of the pocket which parallels the first-mentioned major surface.

81. A camera as defined in claim 78, said slide having at least one projection extending beyond the pocket for engagement by an element of the camera.

82. A camera as defined in claim 81, said projection being formed by at least one exterior dimension of the slide being greater than the corresponding exterior dimension of the pocket.

83. A camera as defined in claim 78; and further comprising means for retaining said slide against unintended movement out of the position in which it closes said window.

84. A camera as defined in claim 78, said slide having friction contact with said pocket to prevent unintended movement of the slide out of the position in which it closes said window.

85. A camera as defined in claim 78, said slide being of elastically yieldable material and engaging said pocket with pretension, so as to be prevented from unintended movement out of its position in which it closes said window.

86. A camera as defined in claim 74, said blocking means comprising a slide in said pocket interposed and slidable between the film strip and a wall of the pocket having said major surface.

87. A camera as defined in claim 86, said slide including a projection extending out of said pocket and beyond said major surface through a slot in the pocket.

88. A camera as defined in claim 74, said blocking means comprising a rotatable disk.

89. A camera as defined in claim 88, said disk being mounted in said pocket between the film strip and a wall of the pocket which has said major surface.

90. A camera as defined in claim 89, said disk including a projection which extends out of said pocket.

91. A camera as defined in claim 90; further comprising means for preventing unintended turning of the disk to a position in which it exposes said window.

92. A camera as defined in claim 91, said preventing means being a retarding spring.

93. A camera as defined in claim 90, said preventing means including an engaging portion on said disk which cooperates with a camera portion when said disk is in a position in which it closes said opening.

94. A camera as defined in claim 90, said disk being of circular shape and including means journalling it for rotation about an axis proximal to a corner of said window; said pocket having a wall provided with said major surface and with an arcuate slot which merges with said window and in which said projection is movable.

95. A camera as defined in claim 74; and further comprising actuating means engageable with said blocking means and operative for moving the blocking means to at least one of the positions in which it exposes and closes said window, respectively.

96. A camera as defined in claim 95, said blocking means having at least one engaging portion, and said actuating means having at least one engaging element engageable with said engaging portion in response to insertion or removal of the pocket from the camera, respectively.

97. A camera as defined in claim 96, said cassette chamber being a duct dimensioned to accommodate said pocket and engaging portion on endwise insertion of the pocket; and said engaging element being a constriction formed in the duct ahead of the optical axis of the camera, so that insertion of the pocket past said constriction results in shifting of said blocking means relative to the pocket to a position in which it exposes said window.

98. A camera as defined in claim 97; and further comprising a spring-biased element extending into said duct and operative for engaging and returning said blocking means to the window closing position thereof, in response to movement of the pocket out of said duct.

99. A camera as defined in claim 74, said camera having a cover movable between an open and a closed position; and further comprising means for moving said blocking means to window exposing position in response to movement of said camera cover to said closed position, and vice versa.

100. A camera as defined in claim 99, said camera cover being slidable between said open and closed positions.

101. A camera as defined in claim 99, said camera cover having a part which is pivotable and slidable, and said means for moving being provided in said part.

102. A camera as defined in claim 101, said means for moving comprising claws which are disengaged from said blocking means when said part of said cover is in an unlatched portion thereof, and which engage and move said blocking means during movement of said part to latched position.

103. A film cassette, comprising an elongated frame of U-shaped cross-section having at least one flat side; light-impeameable means forming a pocket adapted to contain a multi-exposure film strip and including a portion covering at least said one flat side; and a film opening in said pocket extending transverse to the elongation thereof.

104. A film cassette as defined in claim 103, said frame also having three narrow sides one of which is open and being provided with a film guide groove which extends from said one narrow side to another opposite narrow side.

105. A method of making a film cassette, comprising the steps of providing an elongated frame having substantially U-shaped cross-section; feeding an opaque material having a width corresponding to substantially the length of the frame, towards the frame in a direction normal to the elongation of the frame; and sealingly connecting the material about the frame so as to form with the frame a pocket the interior of which is sealed against the entry of light.

106. A method as defined in claim 105, wherein the step of feeding comprises advancing the material as a web, and severing from the web sections of a size requisite for forming the respective pocket.

107. A method as defined in claim 106; and further comprising the step of inserting a strip of light-sensitive film into the frame in direction lengthwise of the same and normal to the feeding direction of the web.

108. A method as defined in claim 107, the step of connecting comprising aligning one longitudinal edge of the frame with a longitudinal edge of the material, connecting the frame and material at said edges, and thereupon carrying out the step of inserting the film strip.

109. A method as defined in claim 107, wherein the film strip is fed towards the frame in a plane parallel to the web, and wherein the frame is placed onto the material and the film strip in direction normal to the feeding directions of the web and film strip, so as to straddle and surround the film strip on three sides thereof.

110. A method as defined in claim 109, wherein the severed web section is folded about a narrow longitudinal side and about a upper side of the frame and is then light-tightly connected with surfaces of the frame which extend parallel to the plane of the film strip.

111. A method as defined in claim 110, wherein the step of connecting is effected by adhesive bonding.

112. A method as defined in claim 110, wherein the step of connecting is effected by heat-welding.

113. A method as defined in claim 105, wherein the frame has an open side, and the step of connecting comprises sealing said material over said open side.

114. A method as defined in claim 105, the frame having two ends at least one of which is open and constitutes an opening for later extraction of a film strip from the pocket; and further comprising the step of installing light-seals at said open end prior to connecting of said frame and material.

* * * * *